US012621162B2

(12) United States Patent
Helferich et al.

(10) Patent No.: US 12,621,162 B2
(45) Date of Patent: May 5, 2026

(54) METHOD AND APPARATUS FOR DETERMINING WHETHER INFORMATION AUTHORIZES ACCESS TO A COMPARTMENT OF A COMPARTMENT SYSTEM

(71) Applicants: Frank Helferich, Leubsdorf (DE); Thilo Kirchheiner, Groß-Zimmern (DE); Thomas Baye, Bonn (DE)

(72) Inventors: Frank Helferich, Leubsdorf (DE); Thilo Kirchheiner, Groß-Zimmern (DE); Thomas Baye, Bonn (DE)

(73) Assignee: Deutsche Post AG, Bonn (DE)

( * ) Notice: Subject to any disclaimer, the term of this patent is extended or adjusted under 35 U.S.C. 154(b) by 530 days.

(21) Appl. No.: 17/949,544

(22) Filed: Sep. 21, 2022

(65) Prior Publication Data

US 2023/0093002 A1 Mar. 23, 2023

(30) Foreign Application Priority Data

Sep. 21, 2021 (DE) .......................... 102021124350.5

(51) Int. Cl.
*G06F 21/35* (2013.01)
*G06F 21/36* (2013.01)
(Continued)

(52) U.S. Cl.
CPC .......... *H04L 9/3239* (2013.01); *H04L 9/3247* (2013.01); *H04L 63/0442* (2013.01)

(58) Field of Classification Search
CPC . H04L 9/3239; H04L 9/3247; H04L 63/0442; G06F 21/35; G06F 21/36;
(Continued)

(56) References Cited

U.S. PATENT DOCUMENTS 10,424,143 B2 * 9/2019 Miller ................ G07C 9/00912
10,621,811 B2 * 4/2020 Tovey ................ G07C 9/00912
(Continued)

FOREIGN PATENT DOCUMENTS

DE 10 2016 123 713 A1 6/2018
WO WO 2019/161870 A1 8/2019
(Continued)

OTHER PUBLICATIONS

Biryukov et al., "Argon2: the memory-hard function for password hashing and other applications" (Specification), Mar. 24, 2017, 20 pages. URL: https://www.cryptolux.org/images/0/0d/Argon2.pdf.
(Continued)

*Primary Examiner* — Andrew Suh
(74) *Attorney, Agent, or Firm* — Reinhart Boerner Van Deuren P.C.

(57) ABSTRACT

Disclosed is a method in which a hash value and a first piece of information are obtained from a second device. The hash value is associated with a compartment of the compartment system, and the first piece of information is associated with a first device. Further, a second piece of information is obtained from the first device. Based on the first piece of information and the hash value, it is determined whether the second piece of information authorizes access to one or more compartments of the compartment system. Three associated methods, one executed by a first device, one executed by a second device, and one executed by a mobile device, are also disclosed. In addition, corresponding devices, systems, and computer programs for the respective execution and/or control of one or more of the disclosed methods are disclosed.

22 Claims, 8 Drawing Sheets

(51) Int. Cl.

| | |
|---|---|
| *G06Q 10/0836* | (2023.01) |
| *G07C 9/00* | (2020.01) |
| *G07C 9/27* | (2020.01) |
| *G07F 9/00* | (2006.01) |
| *H04L 9/32* | (2006.01) |
| *H04L 9/40* | (2022.01) |

(58) Field of Classification Search
CPC ..... G07F 9/002; G07F 17/13; G06Q 10/0836;
G07C 9/00896; G07C 9/27
See application file for complete search history.

(56) References Cited

U.S. PATENT DOCUMENTS

| | | | | |
|---|---|---|---|---|
| 10,764,051 | B2 * | 9/2020 | Schiavoni | ............. H04L 9/3213 |
| 11,321,448 | B1 * | 5/2022 | Sanchez | ................ H04L 9/3236 |
| 11,853,454 | B1 * | 12/2023 | Tarsi | .................... G06F 21/602 |
| 2008/0235772 | A1 * | 9/2008 | Janzen | ................. H04L 9/3226 |
| | | | | 726/5 |

| | | | | |
|---|---|---|---|---|
| 2016/0267738 | A1 | 9/2016 | Carstens et al. | |
| 2017/0132692 | A1 | 5/2017 | Wiechers | |
| 2020/0244652 | A1 * | 7/2020 | Iyer | ....................... H04L 9/0637 |
| 2021/0182863 | A1 * | 6/2021 | Doraiswamy | .......... G06Q 20/02 |
| 2022/0277102 | A1 * | 9/2022 | Kim | ...................... H04L 9/0643 |
| 2023/0012084 | A1 * | 1/2023 | Herrero | ................ H04L 63/083 |
| 2023/0244771 | A1 * | 8/2023 | Kim | .................... H04N 21/475 |
| | | | | 713/186 |

FOREIGN PATENT DOCUMENTS

| | | | |
|---|---|---|---|
| WO | WO 2019/161871 | A1 | 8/2019 |
| WO | WO 2019/161872 | A1 | 8/2019 |
| WO | WO 2019/161873 | A1 | 8/2019 |

OTHER PUBLICATIONS

"Salt (Kryptologie)", Wikipedia (Website), Feb. 2, 2021, 9 pages. URL: https://de.wikipedia.org/wiki/Salt_(Kryptologie).

* cited by examiner

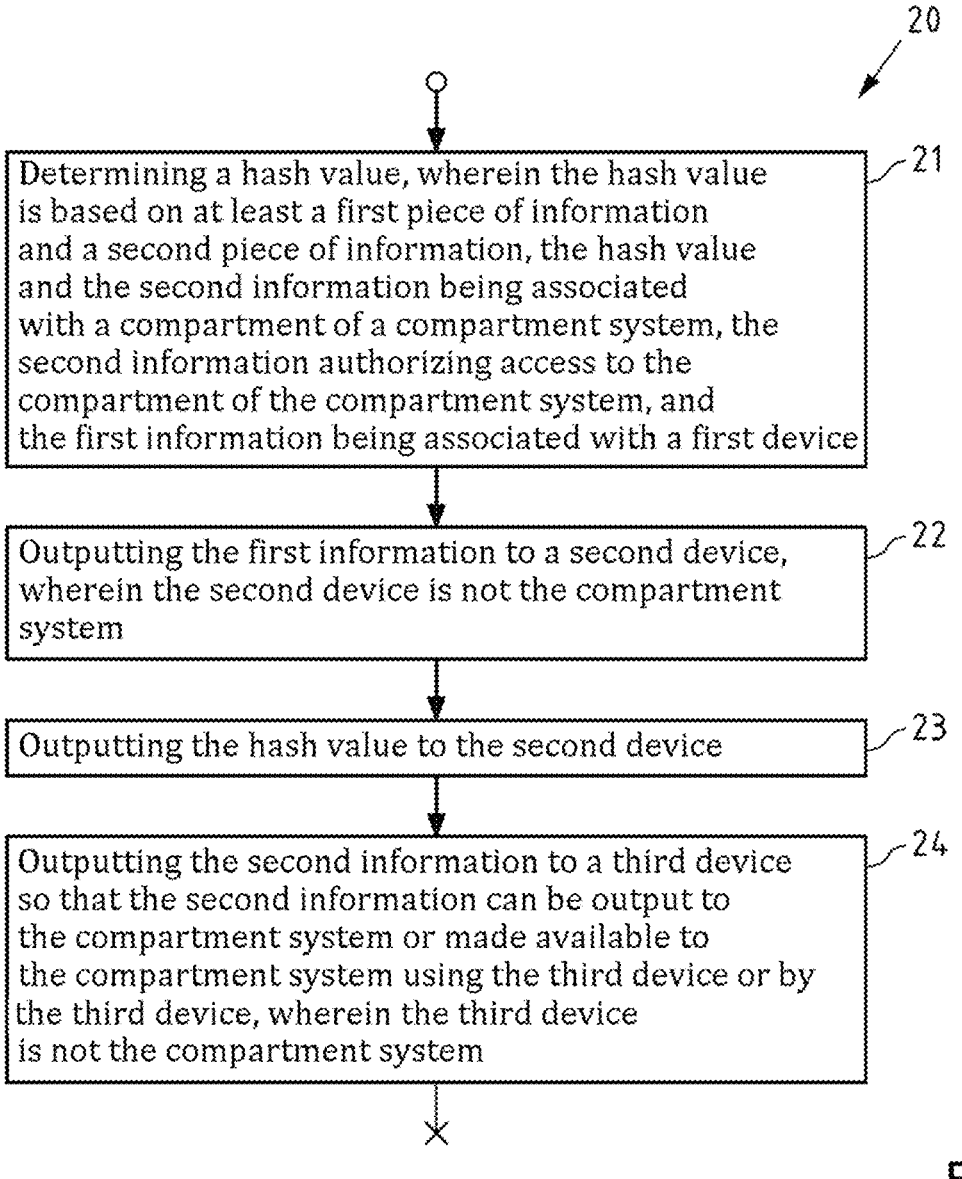

20

Determining a hash value, wherein the hash value
is based on at least a first piece of information
and a second piece of information, the hash value
and the second information being associated
with a compartment of a compartment system, the
second information authorizing access to the
compartment of the compartment system, and
the first information being associated with a first device

21

Outputting the first information to a second device,
wherein the second device is not the compartment
system

22

Outputting the hash value to the second device

23

Outputting the second information to a third device
so that the second information can be output to
the compartment system or made available to
the compartment system using the third device or by
the third device, wherein the third device
is not the compartment system

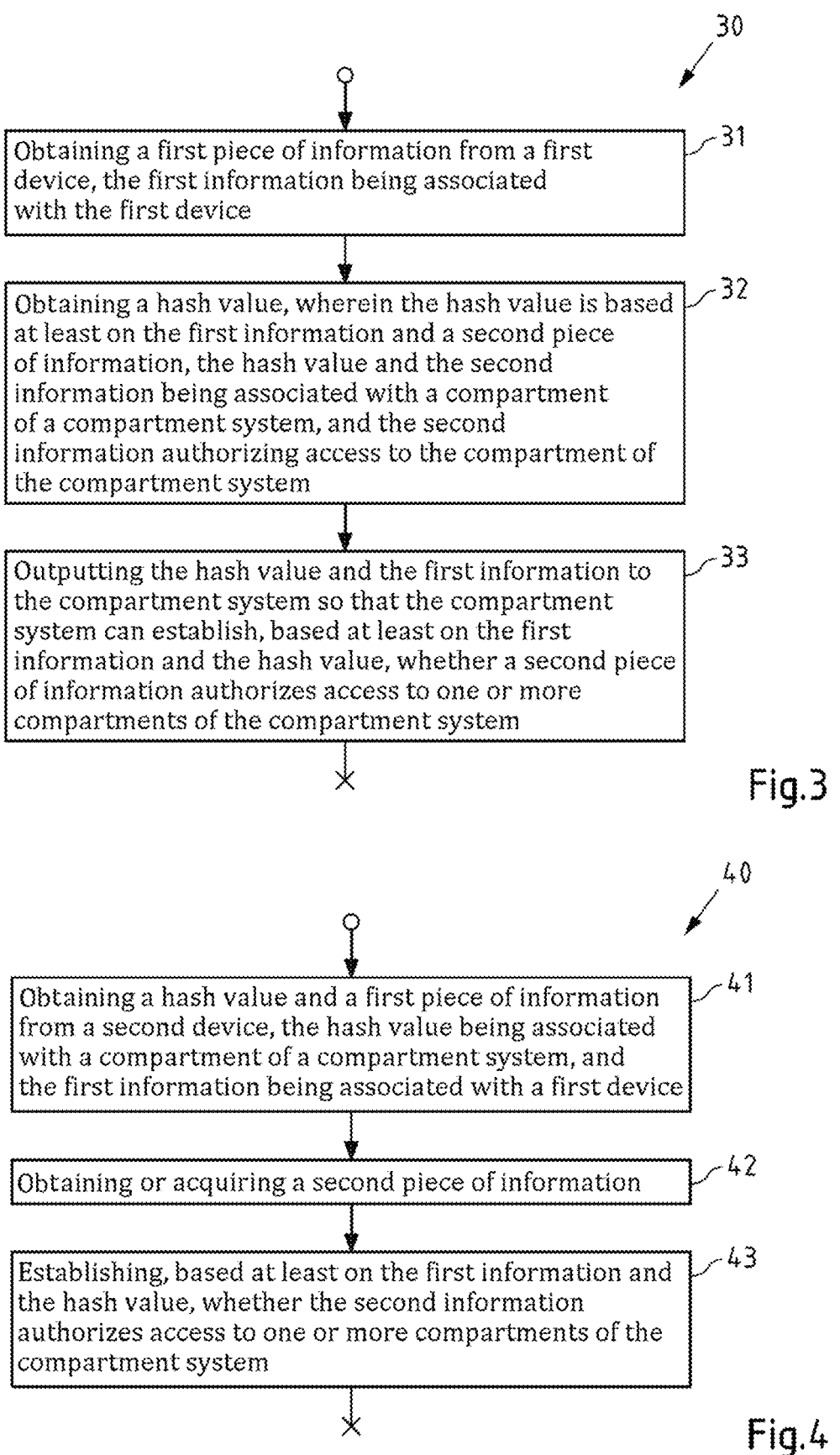

30

Obtaining a first piece of information from a first device, the first information being associated with the first device — 31

Obtaining a hash value, wherein the hash value is based at least on the first information and a second piece of information, the hash value and the second information being associated with a compartment of a compartment system, and the second information authorizing access to the compartment of the compartment system — 32

Outputting the hash value and the first information to the compartment system so that the compartment system can establish, based at least on the first information and the hash value, whether a second piece of information authorizes access to one or more compartments of the compartment system — 33

Obtaining a hash value and a first piece of information from a second device, the hash value being associated with a compartment of a compartment system, and the first information being associated with a first device — 41

Obtaining or acquiring a second piece of information — 42

Establishing, based at least on the first information and the hash value, whether the second information authorizes access to one or more compartments of the compartment system — 43

Fig.4

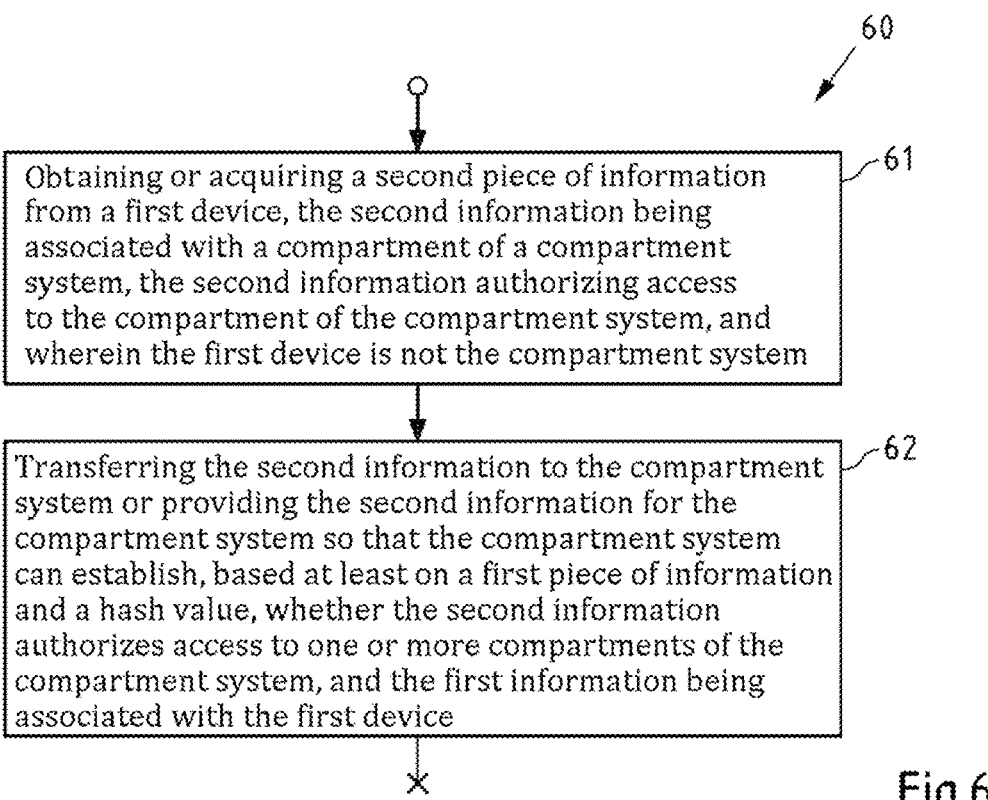

60

61
Obtaining or acquiring a second piece of information
from a first device, the second information being
associated with a compartment of a compartment
system, the second information authorizing access
to the compartment of the compartment system, and
wherein the first device is not the compartment system 62
Transferring the second information to the compartment
system or providing the second information for the
compartment system so that the compartment system
can establish, based at least on a first piece of information
and a hash value, whether the second information
authorizes access to one or more compartments of the
compartment system, and the first information being
associated with the first device

Fig.6

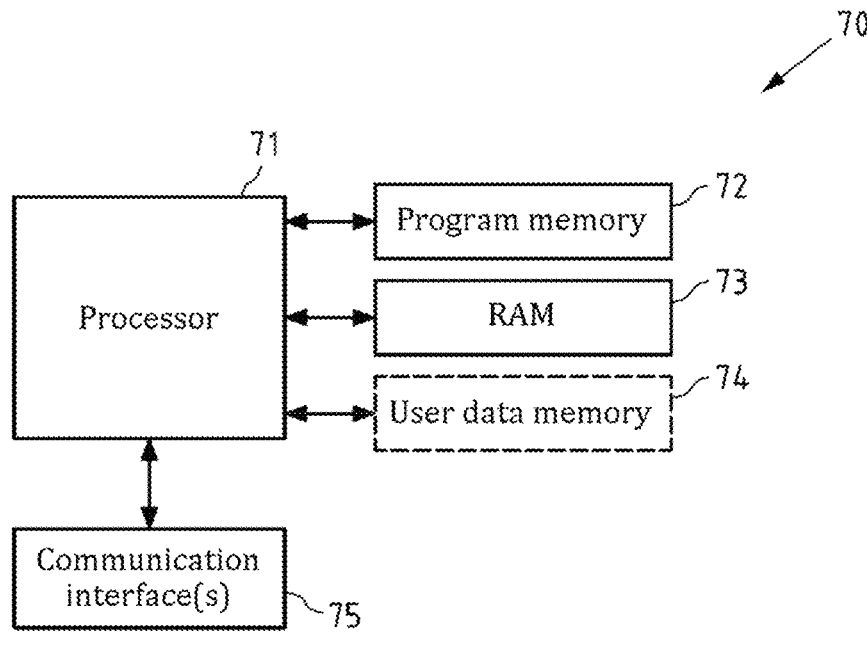

70

71

72
Program memory

73
RAM

74
User data memory

Processor

75
Communication
interface(s)

Fig.7

METHOD AND APPARATUS FOR DETERMINING WHETHER INFORMATION AUTHORIZES ACCESS TO A COMPARTMENT OF A COMPARTMENT SYSTEM

CROSS-REFERENCE TO RELATED PATENT APPLICATIONS

This patent application claims priority to German Patent Application No. 10 2021 124 350.5, filed Sep. 21, 2021, the entire teachings and disclosures of which are incorporated herein by reference thereto.

FIELD

Exemplary embodiments of the invention relate to methods, devices, systems, and computer programs for determining whether a piece of information authorizes access to one or more compartments of a compartment system, in particular wherein the compartment system is a compartment system for collecting and/or depositing consignments of courier or delivery services.

BACKGROUND

Compartment systems are used in various ways, for example, in the form of locker systems or package mailbox systems. An example of a package compartment system is the package station of the applicant, into which a recipient registered with the station can have consignments delivered. The courier places the consignment in a compartment of a package station located near the recipient and/or previously designated by the recipient, locks the compartment and notifies the recipient accordingly. In order for the notified recipient to remove a consignment provided for them from a compartment of the compartment system, the compartment system must establish that the recipient is authorized to gain access to one or more compartments of the compartment system.

BRIEF SUMMARY

With regard to a compartment system, it is generally desirable that it can reliably, efficiently, robustly and securely establish that a user is authorized to access one or more compartments of the compartment system in order to subsequently grant access to the corresponding compartments.

In addition, it is desirable for the use of a compartment system to be flexible so that not only the applicant, who manages a plurality of compartment systems, but also a partner company with different devices or systems can generate access data for compartments of a compartment system in order to make it available to different delivery services or online retailers, for example. For example, compartments can be rented to the partner company on a long-term basis, which then decides independently on the use of the compartments. The technical management of its compartments, whether and which deliveries are placed in them and who the persons authorized to open the compartments are, can therefore be carried out by the partner company, i.e. its technical systems. The technical systems of the applicant can then be limited to the provision of the compartments and the authentication process for opening a compartment. No distinction is made, for example, as to whether the compartment is opened for inserting a delivery by delivery services or end customers or for removal or inspection.

With regard to security, it is particularly relevant that unauthorized access to compartments of the compartment system is prevented. In the event that unauthorized access to a compartment of the compartment system has in fact occurred, it is also relevant to establish at which point in the system, i.e. in whose area of responsibility, a security leak has occurred. If, for example, compromised access data were used during unauthorized access, it is relevant to establish in which system or part of a system the access data were able to be intercepted. This is particularly true if different devices or systems can generate access data for compartments of a compartment system.

In terms of efficiency and robustness, it is particularly relevant that little data needs to be collected and/or processed for providing the compartments and for authorizing the compartment opening. It is therefore advantageous, for example, that an opening code for a compartment contains only a few digits. While in some cases the package station can be operated by scanning a barcode of a printout or a mobile device display, it may also be possible to enter the opening code manually (e.g. if the scanner is defective or if the printout/display is difficult to read). When scanning the opening code, the compartment system then only needs to detect and process few digits (and, for example, correspondingly few digits need to be transmitted to it or entered). On the other hand, it is a disadvantage that the opening code only contains few digits, since it can then be more easily determined by trial and error on the compartment system or by an attacker of the technical infrastructure (hacker, insider attacker), for example by a brute force attack.

With regard to reliability, it is desirable that the compartment system functions independently of whether a data connection, e.g. of a wireless or wired type, is permanently available between the compartment system and a system, e.g. comprising one or more servers, and whether a user can obtain information from the system and/or can exchange information with the system at the time they wish to prove their authorization to access one or more compartments.

The object of the present invention is to overcome one or more of the disadvantages described above and/or to obtain one or more of the advantages described above and/or to achieve one or more of the desired improvements described above.

According to a first exemplary aspect of the invention, a method is disclosed which is executed, for example, by a first device (e.g. a server of a retailer who wants to authorize its customer access to a compartment of a compartment system), the method comprising:

determining a hash value, wherein the hash value is based at least on a first piece of information and on a second piece of information, the hash value and the second information being associated with a compartment of a compartment system, the second information authorizing access to the compartment of the compartment system, and the first information being associated with the first device, outputting the first information to a second device (e.g. a broker which manages and/or is configured to communicate with a plurality of compartment systems), wherein the second device is not the compartment system, outputting the hash value to the second device, outputting the second information to a third device (e.g. a mobile device, e.g. a smartphone of the customer) so that the second information can be output to the compartment system or made available to the compartment system using the third device or by the third device, wherein the third device is not the compartment system.

According to a second exemplary aspect of the invention, a method is disclosed which is executed, for example, by a second device, the method comprising:

obtaining a first piece of information from a first device, the first information being associated with the first device, obtaining a hash value, wherein the hash value is based at least on the first information and on a second piece of information, the hash value and the second information being associated with a compartment of a compartment system, and the second information authorizing access to the compartment of the compartment system, outputting the hash value and the first information to the compartment system so that the compartment system can establish whether a second piece of information authorizes access to one or more compartments of the compartment system, based at least on the first information and the hash value.

According to a third exemplary aspect of the invention, a method is disclosed which is executed, for example, by a mobile device, the method comprising:

obtaining or acquiring a second piece of information from a first device, the second information being associated with a compartment of a compartment system, the second information authorizing access to the compartment of the compartment system, and wherein the first device is not the compartment system, transferring the second information to the compartment system or providing the second information for the compartment system so that the compartment system can establish, based at least on a first piece of information and a hash value, whether the second information authorizes access to one or more compartments of the compartment system, the first information being associated with the first device.

According to a fourth exemplary aspect of the invention, a method is disclosed which is executed, for example, by a compartment system, the method comprising:

obtaining a hash value and a first piece of information from a second device, the hash value being associated with a compartment of the compartment system, and the first information being associated with a first device, obtaining or acquiring a second piece of information, establishing, based at least on the first information and the hash value, whether the second information authorizes access to one or more compartments of the compartment system.

In accordance with each of the aforementioned aspects of the invention, the following are also disclosed:

a computer program, comprising program instructions that cause a processor to execute and/or control the method according to the respective aspect of the invention when the computer program is running on the processor. A processor in this specification shall be understood to include control units, microprocessors, micro-control units such as microcontrollers, digital signal processors (DSP), application-specific integrated circuits (ASICs), or field programmable gate arrays (FPGAs). Either all of the steps in the method can be controlled, or all the steps in the method can be executed, or one or more steps can be controlled and one or more steps can be executed. For example, the computer program can be distributed over a network such as the internet, a telephone or mobile communications network, and/or a local network. The computer program can be at least partially software and/or firmware of a processor. It can also be implemented at least partly as hardware. For example, the computer program can be stored on a computer-readable storage medium, such as a magnetic, electrical, optical and/or other type of storage medium. For example, the storage medium may be part of the processor, such as a (non-volatile or volatile) program memory of the processor or part of it. The storage medium can be, for example, a material or physical storage medium.

An apparatus or system of two, three, four or more devices, configured for executing and/or controlling the method according to the respective aspect of the invention or comprising respective means for executing and/or controlling the steps of the method according to the respective aspect of the invention. Either all of the steps in the method can be controlled, or all the steps in the method can be executed, or one or more steps can be controlled and one or more steps can be executed. One or more of the means can also be executed and/or controlled by the same unit. For example, one or more of the means can be formed by one or more processors. A device according to the first aspect of the invention can be, for example, a server. For example, a server can also mean a part of a server, such as a logical or functional unit. In particular, a server is therefore understood also to mean a system of a plurality of devices which together provide a server function, such as a server cloud. A device according to the first aspect of the invention can also be, for example, a mobile device, for example a smartphone or a hand-held scanner, for example of a supplier or a carrier. A device according to the second aspect of the invention can also be, for example, a server. Again, a server can be a logical or functional unit, so that a server can also be understood to mean a server cloud or server system, for example. A device according to the third aspect of the invention can be, for example, a mobile device, for example a smartphone or a hand-held scanner, for example of a supplier or a carrier. A device according to the third aspect of the invention can also be, for example, a laptop or another electronic device, however, e.g. with an output. A device according to the fourth aspect of the invention can be, for example, a compartment system. In exemplary embodiments, each of the devices described above for the execution and/or control of the method may cooperate with one or more other devices in accordance with the respective aspect of the invention. A device that executes and/or controls the method according to the third aspect of the invention can do so, for example, with the support of or in cooperation with a further device, for example a server that performs (intermediate) steps of the method. The same shall apply mutatis mutandis to devices which execute methods in accordance with another aspect of the invention.

A device comprising at least one processor and at least one memory containing program code, wherein the memory and the program code are configured to cause a device having the at least one processor to execute and/or control at least the method according to the respective aspect of the invention. Either all of the steps in the method can be controlled, or all the steps in the method can be executed, or one or more steps can be controlled and one or more steps can be executed.

In terms of terminology, a "first device", a "second device" and a "third device" can each be any kind of device. However, a "first device" can also be, for example, a device according to the first aspect of the invention. A "second device" can be, for example, a device according to the second aspect of the invention. A "third device" can also be, for example, a device according to the third aspect of the invention. In addition, for example, the "first device" mentioned in the methods according to various aspects of the invention may be the same device across all the methods. Similarly, for example, the "second device" in the methods can be the same device according to different aspects of the invention. Similarly, the "third device" in the methods can be the same device according to different aspects of the invention.

The same applies to the "first information", which can be the same information across all methods, for example, and the "second information", which can be the same information across all methods.

EXEMPLARY CHARACTERISTICS OF THE EXEMPLARY ASPECTS OF THE INVENTION

The various exemplary aspects of the present invention may have the characteristics described below, among others.

A compartment system comprises a plurality of compartments (for example, more than one compartment or more than two compartments). The compartments are designed, for example, to accommodate consignments (e.g. letters, parcels, packages), deliveries (e.g. laundry that is cleaned or to be cleaned, meals from delivery services (e.g. pizza or sushi service), etc.) or objects (e.g. valuables, luggage, etc.). Each of the compartments can be closed, for example by means of a door or flap. For example, the compartments are essentially cuboid-shaped containers, which are fitted with doors or flaps on one or more sides. For example, a plurality of compartments are arranged on top of each other and/or side by side in the compartment system. For example, the compartment system can consist of one or more modules arranged side by side, with one or more compartments arranged on top of each other in each module. The respective doors of the compartments are then, for example, hinged to the side and can be opened to the front, for example. The compartments in the compartment system can all be the same size. As an alternative, at least some of the compartments in the compartment system can have different sizes. For example, the compartment system can have compartments for letters (letter boxes) and/or compartments for packages (package compartments). For example, the letter boxes within the compartment system each have the same size, but two or more different sizes are also possible. The package compartments can be represented in the compartment system with only one size or with different sizes. The compartment system can be designed, for example, as a parcel shelf system or a combined letter and parcel shelf system.

For example, each of the compartments is provided with a lock to control access to the individual compartments of the compartment system by users. For example, the lock of a compartment can be located in or on the compartment, for example on a door (e.g. also in the form of a flap) of the compartment. If the lock is not located on the door (for example, on a side wall of the compartment), it interacts with the door, for example, by inserting a latch into or withdrawing it from a door opening. The lock of a compartment can, for example, return to a locked position by default and can then only be activated for unlocking, for example. Once the lock has been unlocked, the door of the compartment can be opened, for example. Since the lock automatically returns to the locked position, the compartment can be locked by closing the door, for example by using a trap function of the lock when the door is closed.

A compartment of the compartment system can be either open or closed. When the compartment is in the open state, the compartment lock is unlocked. The door of the compartment can then be opened, for example, by a person without using force, or is open. However, when the compartment is closed, the compartment lock is locked. For example, the door of the compartment can no longer be opened without the use of force by a person who is not authorized to open it.

For example, the lock of each compartment can be controlled, in particular in electronic form. In particular, at least the process of locking and/or unlocking the lock can be controlled. The lock of a compartment can be controlled, for example, by a lock control unit, wherein either each lock is assigned its own lock control unit, or one (e.g. central) lock control unit controls some (e.g. those of one module of the compartment system) or all locks of the compartment system. In the former case, multiple lock control units, for example all lock control units or those of one or more modules of the compartment system, are controlled by a higher-level control unit, for example, whereas in the latter case, for example, there is wiring interconnecting the lock control unit and each of the locks it controls, wherein signals transmitted via a particular wiring or applied voltages are then only assigned to the lock to which the wiring leads, but not to other locks. Alternatively, it is also possible to use a bus to which both the lock control unit and a plurality of locks are electrically connected. In this case, however, a unit is required in each lock to evaluate the control signals received via the bus, which makes the locks more complex and therefore more expensive than in the direct wiring case.

For example, a lock control unit (in particular the central lock control unit) can not only perform the control of the lock or locks, but can also establish whether information obtained or acquired (for example, also information referred to as "second information") authorizes access to one compartment or more than one compartment of the compartment system. If it is established that the information does authorize access, then, for example, access to the compartment or compartments can be granted (e.g. by unlocking the compartment door or the compartment doors). If it is established that the information does not authorize access, then, for example, access to the compartment or compartments can be denied (e.g. by unlocking the compartment door or the compartment doors).

In order for a compartment system and/or a unit belonging to it, e.g. a lock control unit, and/or a system comprising a compartment system to be able to establish whether a second piece of information authorizes access to one compartment or more than one compartment of the compartment system, for example, the compartment system or a system comprising the compartment system executes the steps of the method according to the fourth exemplary aspect of the invention. In the following, it is stated repeatedly that a compartment system carries out one or more steps of the method according to the fourth aspect of the invention. It is true that one embodiment of the method according to the fourth aspect of the invention is that the compartment system executes all the steps of the method according to the fourth aspect of the invention. However, the description of these steps should also be explicitly understood in such a way that the respective step or part thereof can also be carried out by a different device, which is, for example, part of a system that comprises the compartment system.

Establishing whether the second information authorizes access to one or more compartments of the compartment system in the method according to the fourth exemplary aspect of the invention is based at least on a first piece of information and a hash value. This first information and this hash value, for example, are also part of the methods according to the first to third aspects of the invention, as well as the second information.

Exemplary Characteristics of the Method According to the First Exemplary Aspect of the Invention The method according to the first aspect of the invention comprises determining a hash value, the hash value being based at least on a first piece of information and on a second piece of information. A hash value can be, for example, a mapping of the first information and/or the second information. The mapping can be carried out, for example, by means of a function or an algorithm, wherein the first and/or the second information is an input value to the function or algorithm. The mapping is then, for example, the output value of the algorithm. In particular, the mapping can be such that the first and/or second information cannot or not easily be determined from the hash value. This means, for example, that the mapping must be generated for a plurality of input values in order to find out which input value is mapped to the given hash value. By contrast, the function or algorithm used is not invertible, for example. Advantageously, the mapping function or algorithm can generate confusion, for example, so that no relationship between the input value and output value of the function or algorithm can be identified. The mapping for given input values is also not necessarily unique, but it may be. A simple example of a mapping that is not invertible is the sum of digits of a number.

In the method according to the first aspect of the invention, the hash value and the second information are associated with a compartment of a compartment system, wherein the second information authorizes access to the compartment of the compartment system.

The second information can be a password, for example, such as a plain text password. The second information can also be generated, for example, in the method according to the first aspect of the invention. The generation can be pseudo-random, random, deterministic and/or dependent on parameters, wherein such parameters can relate e.g. to time of day, date, place of generation, or similar. Alternatively, the second information can be obtained, for example, in the method according to the first aspect of the invention. In exemplary embodiments, the second information can authorize access to only one compartment of the compartment system. In other embodiments, the second information can additionally authorize access to one or more additional compartments of the compartment system.

The format of the second information is arbitrary; it can consist of letters, numbers, symbols, patterns, bit strings, etc. A combination of these formats is also possible. An example of the second information could comprise or consist of 5, 8, 9, 10, 20, 50, any number between these values, or more or fewer alphanumeric characters.

For example, the association of the second information with a compartment of a compartment system may already be given by the fact that the second information authorizes access to the compartment of the compartment system. The association of the hash value with the compartment of the compartment system is given, for example, by the fact that it is usable and/or required when establishing whether the second information authorizes access to one or more compartments of the compartment system.

However, the association of the second information and/or the hash value with the compartment of the compartment system can also be characterized as follows. For example, the second information and/or the hash value can each be attributed to the compartment of a compartment system separately or together. This attributability can be achieved, for example, by storing the second information and/or the hash value in respective data structures, e.g. databases or memory objects, in such a way that the one and/or the other can be attributed to the compartment of the compartment system. The attributability can additionally or alternatively be achieved by linking the second information and/or the hash value to an indicator, for example, which is also output or obtained, for example, when the hash value and/or the second information is output or obtained. However, the association does not necessarily mean that the second information and/or the hash value can be used to determine the compartment of a compartment system with which it is associated. In particular, it is not possible for any given device to establish the compartment of a compartment system with which the second information and/or the hash value is associated. For example, only one or more of the first, second, and third devices can establish the compartment of a compartment system with which the second information and/or a hash value is associated. In addition, determining the compartment of a compartment system with which the second information is associated requires, for example, access to the hash value and further information.

The hash value is based not only on the second information, however, but also at least on a first piece of information.

The format of the first information is arbitrary, as has already been described for the format of the second information. This can involve letters, numbers, symbols, patterns, bit strings, or similar. The nature of the first information can differ in different embodiments of the invention. For example, if the hash value is a mapping that was obtained by means of a hashing function or a hashing algorithm, the first information can be a salt. The first information can then be appended to the second information, for example. The two pieces of information can then be, for example, the input value to the hashing function or the hashing algorithm. For example, appending the first information to the second information increases the entropy of the input value.

The first information is also associated with a first device. The association may consist in the fact that the first device has generated, obtained, provided, stored or otherwise processed the first information, in particular in connection with the determination of one or more hash values that are based at least on the first information. The type of association may additionally or alternatively be such that the first information is attributed or can be attributed to, for example, a person, a company, an organization or a system which controls, checks or manages the first device. The association does not necessarily imply that the first piece of information can be used to determine the device with which it is associated.

The method according to the first aspect of the invention also comprises outputting the first information to a second device (hereafter also referred to as the "broker"), where the second device is not the compartment system. In addition, according to the first aspect of the invention, the method comprises outputting the hash value to the second device. The first information and the hash value can be output to the second device together, for example in one message. They can also be output to the second device separately, for example in different messages and/or independently of each other.

In principle, an output can be provided, for example, on a screen and/or printed on paper, for example as letters and/or numbers and/or as an optical pattern, e.g. as a barcode or QR code. This can also be carried out, for example, in such a way that another device can acquire or obtain the information output, e.g. the first information and/or the hash value, e.g. by scanning a barcode or QR code. For example, a first device can perform an output to another device. In principle, however, the output can also be delivered by means of one or more messages, for example one or more packets of a communication protocol, such as 3G, 4G, Bluetooth, Ethernet, or NFC. Information, such as the first information and/or the hash value, can thus be output to another device, for example, over the internet and/or another network. The output can in principle be encrypted or unencrypted, wherein different types of encryption can be used, e.g. symmetric or asymmetric encryption.

Furthermore, according to the first aspect of the invention, the method comprises outputting the second information to a third device so that the second information can be output to the compartment system or made available to the compartment system using the third device or by the third device, wherein the third device is not the compartment system. In particular, the first information and the hash value are thus output, for example, to a different device than the second information. In addition, for example, in some embodiments the second information is output only to the third device and not to other devices.

Exemplary Characteristics of the Method According to the Second Exemplary Aspect of the Invention The method according to the second aspect of the invention comprises obtaining a first piece of information from a first device. The first information, for example as described above, is associated with the first device.

Furthermore, according to the second aspect of the invention, the method comprises obtaining a hash value, wherein the hash value is based at least on the first information and on a second piece of information, the hash value and the second information being associated with a compartment of a compartment system, and the second information authorizing access to the compartment of the compartment system. The first information and the hash value can be obtained together or separately, as described above in the same way as the output of the first information and the hash value.

However, the device that receives the first information and the hash value does not obtain the second information, for example, and does not otherwise have access to the second information either. For example, based on the first information and the hash value, it is impossible or almost impossible for the device to determine the second information. In particular, from the hash value, which is, for example, a mapping of the first and second information, the device cannot draw inferences as to the second information, for example. This can be true even if the device has access to the first information.

The method according to the second aspect of the invention also comprises outputting the hash value and the first information to the compartment system so that the compartment system can establish whether a second piece of information authorizes access to one or more compartments of the compartment system, based at least on the first information and the hash value. The output can be as described earlier for the output of the first information and the hash value in the method according to the first aspect of the invention.

In order to allow the hash value and the first information to be output to the compartment system that has the compartment with which the hash value is associated, the method according to the second aspect of the invention can comprise establishing the compartment system that has the compartment with which the hash value is associated. This establishment can be based, for example, on an indicator attributed to the hash value and, for example, is also obtained as part of the method according to the second aspect of the invention. Other embodiments are also possible, so that it is also possible to establish, based on how and/or from which device a hash value is obtained, the compartment system that has the compartment which is associated with the hash value. This establishment is particularly relevant, for example, when a device executing the method according to the second aspect of the invention receives a plurality of hash values and/or first pieces of information, and hash values of the plurality of hash values are associated with compartments of different compartment systems. Establishing the compartment system that has the compartment which is associated with a hash value then enables the output of the hash value and the first information on which the hash value is based to precisely this compartment system.

For example, the compartment system can execute or control the method according to the fourth aspect of the invention.

Exemplary Characteristics of the Method According to the Third and Fourth Exemplary Aspects of the Invention The method according to the fourth aspect of the invention comprises obtaining a hash value and a first piece of information from a second device, the hash value being associated with a compartment of the compartment system, and the first information being associated with a first device. For example, the hash value is based on at least the first information. The hash value and the first information can also be obtained in the method according to the fourth aspect of the invention, for example, together or separately, as described above in the same way as the output of the first information and the hash value for the methods according to the first and second aspects of the invention.

In addition, the method according to the fourth aspect of the invention comprises obtaining or acquiring a second piece of information.

The second information may be transferred or made available in the context of a method according to the third aspect of the invention. In particular, the method according to the third aspect of the invention, which can be executed or controlled by a mobile device, for example, comprises obtaining or acquiring a second piece of information from a first device, the second information being associated with a compartment of a compartment system, the second information authorizing access to the compartment of the compartment system, and wherein the first device is not the compartment system. In addition, according to the third aspect of the invention, the method comprises, for example following or in response to the receipt or acquisition of the second information, transferring the second information to the compartment system or providing the second information for the compartment system so that the compartment system can establish, based at least on a first piece of information and a hash value, whether the second information authorizes access to one or more compartments of the compartment system, the first information being associated with the first device.

The second information can be acquired or obtained from a compartment system, for example, via an internet connection, a wireless connection such as Bluetooth, NFC, WLAN, 4G, 5G and/or, for example, by means of an optical pattern such as a barcode or QR code which is displayed, e.g., on a screen of the device that transfers or provides the second information. However, the second information can also be obtained or acquired indirectly, for example, by the device from which the second information is obtained transmitting the second information to a forwarding device and the second information being obtained from the forwarding device. In addition or alternatively, the second information can also be obtained, for example, by the device from which the second information is obtained providing the second information by displaying the second information, for example as letters and/or numbers. Then, for example, a person can read this display. The second information can then be entered, for example, by the person via a keyboard or other acquisition unit of the device or compartment system that receives or acquires the second information, so that the second information is obtained or acquired by this route.

For example, the transmission and/or provision of the second information and the corresponding acquisition or receipt of the second information can only be possible, for example, in such a way that a device and/or a user wishing to transmit and/or provide the second information must be located near to the acquiring or receiving device (e.g. at a distance of less than an arm's length, 1 m, 5 m, 10 m, 50 m, 1 km, within the same radio cell, within range of a short-range radio link, e.g. NFC or WLAN or Bluetooth link, or within visual range) and/or that a second piece of information can only be transmitted and/or provided and/or obtained and/or acquired at a predetermined, e.g. maximum, speed. An example of this is a Bluetooth or NFC transmission, for example, from a smartphone to the compartment system. Another example is the provision of one or more optical patterns by means of a mobile device and the acquisition of the pattern or patterns by, for example, a compartment system. Another example is a user input on the compartment system, wherein the information entered corresponds, for example, to the second information provided by a mobile device and read off by a user.

An exemplary limitation of the maximum and/or practically achievable speed of the transmission/provision/receipt/ acquisition of the second information can be advantageous from a security point of view. For example, an attacker could try to send a large amount of second information to a compartment system in the context of a brute force attack in order to test whether one or more of these second pieces of information authorizes access to one or more of the compartments of the compartment system (i.e. the attacker tries to guess a second piece of information that authorizes access). By limiting the maximum and/or practically achievable speed of transmission/provision/receipt/acquisition of the second information, for example, the time required for transmission of each piece of second information increases. An attack that is based on transferring as much second information as possible (i.e. the attacker wants to attempt as many guesses as possible) will then take longer than if the second information can be transmitted more quickly. However, a second piece of information is only valid for a limited period of time. The slower the transmission of the second information, the less second information an attacker can try in this limited time. This reduces the likelihood that an attacker will transmit a second piece of information by chance to a compartment system that actually authorizes access (i.e., guesses correctly by chance). This method makes brute force attacks, for example, more difficult. In return, for example, the length of the second piece of information sent to the compartment system in order to gain access to one or more compartments of the compartment system can then be reduced. This is because the time required for a brute force attack is then still not less or significantly less than if the second information was longer but could be transmitted faster. Such a reduction in length is advantageous, for example, because less data has to be transferred and/or processed overall, for example on the compartment system and/or on a device that transmits the data to it or provides the data for it. Also, the exemplary requirement that a device and/or a user must be physically near to a compartment system to transmit the second information to the compartment system can also increase the security of the compartment system, for example, by preventing the compartment system from being attacked from a remote location, for example via the internet.

In addition, a transmission of the second information which does not make use of an internet connection has the advantage that the device that receives or acquires the second information, e.g. a compartment system, and/or the device that transmits or provides the second information, e.g. a mobile device, do not require an internet connection at the time when the second information is transmitted. This is particularly advantageous, for example, if a compartment system is to obtain the second information from a smartphone in a location where there is no stable internet connection. This may be the case, for example, in an underground car park or in rural areas where the mobile communications network coverage is not sufficient to provide a stable internet connection.

For example, outputting and obtaining a first piece of information and a hash value from a second device to a compartment system as well as outputting and obtaining a second piece of information from a first device to a mobile device may require an internet connection in each case. These internet connections are then required, for example, before a user can pick up a consignment deposited for them in a compartment system or before a supplier can deposit a consignment in a compartment system, in particular in the method according to the fourth aspect, before it is established, based at least on the first information and the hash value, whether the second information authorizes access to one or more compartments of the compartment system. However, it is sufficient that the internet connections were briefly available at some time before this is established. In particular, in this way, a compartment system in an underground car park, for example, can function more reliably than if an internet connection to a server is required to establish the necessary information.

FURTHER EXEMPLARY EMBODIMENTS OF THE EXEMPLARY ASPECTS OF THE INVENTION

Exemplary embodiments and further advantages of the exemplary aspects of the invention are described in the following, wherein their disclosure is intended to apply equally to all four aspects of the invention.

According to an exemplary embodiment of the fourth aspect of the invention, establishing whether the second information authorizes access to one or more compartments of the compartment system comprises determining a check hash value, the check hash value being based at least on the first information and the second information. The determination of the check hash value can follow the same method as the determination of the hash value in the method according to the first aspect of the invention.

According to an exemplary embodiment of the fourth aspect of the invention, establishing whether the second information authorizes access to one or more compartments of the compartment system also comprises comparing the check hash value with one or more hash values of a plurality of hash values, each of which is associated with a compartment of the compartment system. For example, if the check hash value matches a hash value of the plurality of hash values, it can be established that the second information authorizes access to a compartment of the compartment system. If the check hash value does not match a hash value of the plurality of hash values, it can be established, for example, that the second information does not authorize access to a compartment of the compartment system. If the check hash value does not match a hash value of the plurality of hash values, however, in some embodiments a new check hash value can also be determined, for example, using a different method. Alternatively or in addition, the same method can be used with a different configuration. The newly determined check hash value can then also be compared, for example, with one or more hash values of a plurality of hash values, each of which is associated with one compartment of the compartment system. The result of the check can then be the same as described previously for the (first) check hash value.

In accordance with an exemplary embodiment of the fourth aspect of the invention, in establishing whether the second information authorizes access to one or more compartments of the compartment system, by means of comparing the check hash value with one or more hash values of the plurality of hash values or by means of using the comparison of the check hash value with one or more hash values of the plurality of hash values, it is possible to establish the compartment of the compartment system or the compartments of the compartment system to which the second information authorizes access. For example, a compartment system that establishes the information can have access to an attribution of hash values to respective compartments of the compartment system, for example according to the association of hash values with respective compartments of the compartment system. If the check hash value matches a hash value of the plurality of hash values, it can be established, for example, that the second information authorizes access to the compartment of the compartment system to which the hash value is attributed. It is therefore not necessary for a compartment system to obtain, in addition to the second information, information that specifies the compartment of the compartment system for which the second information might authorize access.

The method according to an exemplary embodiment of the fourth aspect of the invention may comprise obtaining, for example by a compartment system, one or the plurality of hash values each associated with a compartment of the compartment system. The plurality of hash values can be obtained, for example, from the second device, from which the hash value and the first information was also obtained. This can be carried out in such a way that some or all of the hash values of the plurality of hash values are obtained together or simultaneously. Alternatively, some or all hash values of the plurality of hash values can be obtained consecutively.

According to one exemplary embodiment, the plurality of hash values can comprise one or more hash values, each of which is based at least on the first information. The one or more hash values, each based at least on the first information, can be determined, for example, in the method according to the first aspect of the invention. They can be, for example, hash values of a plurality of hash values, each of which is based at least on the first information and determined in an exemplary embodiment according to the first aspect of the invention. The hash value obtained in the method according to the second aspect of the invention can then be a hash value of this plurality of hash values in an exemplary embodiment of the method according to the second aspect of the invention. The hash values of the plurality of hash values, for example all or some of them, can each be based on different, e.g. unique, second pieces of information, whereas they are based at least on the same first information.

In one exemplary embodiment according to the first aspect of the invention, the plurality of hash values, each based at least on the first information, is determined only in a predetermined period of time. Hash values that are based on at least other information instead of at least the first information are also determined in another predetermined period of time. Thus, for example, in the method according to the first aspect of the invention, a first piece of information is only used to determine hash values in a predetermined period of time. The first information is then changed. For example, the predefined period can be one hour, one day, one week, one month, one year, or any other period.

Determining a plurality of hash values, each of which is based at least on the first information, can be particularly advantageous. A particularly advantageous scenario is as follows. In the context of the method according to the fourth aspect of the invention, a compartment system can obtain a plurality of hash values and corresponding first pieces of information, e.g. from a second device, the hash values being based at least on the respective first piece of information. The compartment system then receives a second piece of information. In order to establish whether the second information authorizes access to one or more compartments of the compartment system, the compartment system determines a check hash value which is based at least on a first piece of information and the (obtained) second information. However, the compartment system cannot detect, for example, from the second information whether and on which first piece of information a hash value, which is based at least on the second information, is based. Thus, the compartment system must determine a check hash value, for example, for each first piece of information obtained, which is based on the second and the respective first piece of information. It is therefore efficient, for example, if a compartment system receives a plurality of hash values, each of which is associated with a compartment of the compartment system, but the plurality comprises multiple hash values, each based at least on the same first information. This can reduce the number of check hash values to be determined, for example. The more difficult it is to determine a check hash value, for example, the more the efficiency can be increased.

According to an exemplary embodiment of the method according to the fourth aspect of the invention, the check hash value can be an output value of a hashing algorithm, wherein at least the first information and the second information are input values of the hashing algorithm. Similarly, according to an exemplary embodiment of the method according to all aspects of the invention, the check hash value can be an output value of a hashing algorithm, wherein at least the first information and the second information are input values of the hashing algorithm. For example, to determine the check hash value and to determine the hash value, the same hashing algorithm, e.g. with an identical configuration, can be used.

According to an exemplary embodiment of all aspects of the invention, the first information is additional information for a hashing algorithm that is intended to increase the security of the hashing algorithm. According to an exemplary embodiment of all aspects of the invention, the first information can be, for example, a salt, e.g. of the hashing algorithm described above. In the context of the invention, for example, this means that there can be a plurality of hash values associated with one compartment of a compartment system (the same compartment system or different compartment systems), which are determined by the same device, and which are each based on at least the same first information, i.e. the same salt. For example, a salt refers to a piece of additional information (possibly chosen at random) that is appended to another piece information (e.g. an input value to a hashing algorithm) before further processing (e.g. input into a hashing algorithm). This can be used, for example, to increase the entropy of the input. This makes, for example, dictionary attacks and brute force attacks more difficult. In other embodiments of all aspects of the invention, the first information can be, for example, a pepper or a padding. For example, a pepper refers to a secret piece of additional information that is appended to another piece of information (e.g. an input value to a hashing algorithm) before further processing (e.g. input into a hashing algorithm). This can make, for example, dictionary and brute force attacks more difficult. A padding refers, for example, to an additional piece of information that is prepended or appended to another piece of information (e.g. an input value to a hashing algorithm) before further processing (e.g. input to a hashing algorithm) to disguise the length or the start and/or end of the information.

For example, the hashing algorithm can be a hashing algorithm for which the hashing complexity is configurable, for example using parameters. For example, the memory space requirements of the hashing algorithm during hashing can be configurable. In addition or alternatively, for example, how many iterations of one or more calculation steps must be performed can be configurable. As an example of such an algorithm, in the following an Argon2 algorithm is considered, as described e.g. in version 1.3 of the specification "Argon2: The memory-hard function for password hashing and other applications" by authors Alex Biryukov, Daniel Dinu and Dmitry Khovratovich of the University of Luxembourg, dated Mar. 24, 2017. For example, such an algorithm only runs efficiently on x86-based standard server hardware or PC hardware. The method known in the prior art of attacking some hashing methods with special hardware in the form of graphics cards or special CPUs is made more difficult by the fact that the algorithms of the Argon2 family can be configured in such a way that they require large amounts of memory space and/or a comparable amount of time per hashing operation. This allows the increasing performance of more modern processors to be compensated by simply selecting the parameters associated with the hash value. Therefore, a relatively short second piece of information is sufficient to achieve a reasonable level of security with a hash value based on the second piece of information.

This applies in particular if the speed of transmission of a second piece of information to a compartment system is limited and/or, for example, cannot be carried out via the internet. However, a corresponding level of security could not be achieved, for example, with hashing algorithms that are or are designed to be fast and simple to implement. This can be the case, for example, with hashing algorithms the purpose of which is merely to make the integrity and/or authenticity of data verifiable.

In addition, a second piece of information can, for example, authorize access to only one compartment of the compartment system. Even "guessing" a second piece of information that authorizes access by an attacker can therefore only lead to a very limited compromise of the compartment system.

Furthermore, according to an exemplary embodiment of all aspects of the invention the second information can authorize access to the compartment of the compartment system with which it is associated only in a predetermined period of time. This makes it more difficult for an attacker to guess a second piece of information that would authorize access, in particular in comparison to an access authorization credential such as a user ID that is constant. This applies in particular in combination with the measures for increasing security described above. In addition, for example, a "trio" of a second piece of information, a first piece of information, and a hash value that is based at least on this second information and this first information can only be determined and/or used once as proof of access authorization. This increases security, for example, in comparison to a password that e.g. a user specifies and/or can use multiple times as proof of access authorization.

The security of the methods according to all aspects of the invention can be further increased, for example, if, according to an exemplary embodiment, the second information is determined randomly (or pseudo-randomly), for example by the first device. This can be particularly advantageous if a plurality of hash values, each associated with one compartment in the compartment system, are or can be based on at least the same first information. Because even then, a hash value that is based at least on a first piece of information and on a second piece of information, is at least partly based on a random portion (the second information), on which no other hash value is normally based.

In addition or alternatively, further measures may improve the security of the methods in accordance with all aspects of the invention. For example, the first piece of information, the second piece of information, and/or the hash value can be encrypted and/or signed. In an exemplary embodiment according to the first aspect of the invention, the hash value is output in particular in encrypted form and/or with an asymmetric signature. In an exemplary embodiment according to the second aspect of the invention, the hash value is then obtained in encrypted form and/or with an asymmetric signature. For example, a device that receives the hash value can verify whether the connection over which the hash value was obtained is correct. It can establish the correctness of the connection, e.g. by TLS checking against a pinned certificate.

Alternatively, or in addition, the method according to the first aspect of the invention in one exemplary embodiment may comprise the output of a counter that can be attributed to the hash value. The method according to the second aspect of the invention can then comprise, for example, obtaining a counter that can be attributed to the hash value. For example, a device that receives the hash value and the counter can verify the integrity of the obtained hash value.

For example, it can check the integrity by establishing whether the counter that can be attributed to the hash value is increased in comparison to a counter that can be attributed to a previously obtained hash value. For example, the integrity check can also take into account a validity period of the hash value.

Further test steps are possible in the method according to the second aspect of the invention. For example, the admissibility of a obtained hash value can be checked. For example, this check can be based on how the hash value was obtained, for example in which format. As an alternative or in addition, further information can be taken into account in the check. For example, additional information such as a PartnerID, which relates to an organization that controls the first device, a CompartmentsystemID and/or a CompartmentID, can each be obtained and attributed to the hash value obtained. The method according to the second aspect of the invention can then comprise, for example, checking whether the hash value is permissible, taking into account the further information.

The check steps, in particular concerning a connection correctness check, an integrity check and an admissibility check, were described above in relation to the method according to the second aspect of the invention. Alternatively, or in addition, these checks can also be carried out, for example, as part of the method according to the fourth aspect of the invention.

In one exemplary embodiment, the method in accordance with the fourth aspect may additionally comprise storing the second information, in particular if, based at least on the first information and the hash value, it has been established that the second information authorizes access to one or more compartments of the compartment system. The stored second information can then serve as proof that the second information was obtained or acquired in plain text, e.g. before access to a compartment was granted. This proof function is made possible by, for example, allowing practically no inferences to be drawn as to the second information based on the first information and the hash value. However, a compartment system which executes the method according to the fourth aspect of the invention and a device which executes the method according to the second aspect of the invention, for example, only have access to the first information and the hash value. Even if this compartment system or this device were to be compromised by an attacker, the attacker would not be able to determine the second information based on the intercepted first information and the intercepted hash value. Therefore, storing the second information, e.g. at a compartment system, can enable the identification of which devices have been compromised or not compromised if an attacker has gained unauthorized access to a compartment of the compartment system with a second piece of information.

The fact that practically no inferences can be drawn as to the second information based on the first information and the hash value can also be particularly advantageous if the second device, in accordance with an exemplary embodiment of all aspects of the invention, is not only configured to transmit or transfer the hash value to the compartment system but is also configured to communicate with a plurality of compartment systems. If the second device were compromised in this situation and an attacker could draw inferences from the intercepted hash values and first pieces of information as to the respective second information, which would authorize access to respective compartments of the respective compartment systems, the attacker could gain access to a plurality of compartments of a plurality of compartment systems. Such a scenario is prevented by the second device not having access to second pieces of information that authorize access to the respective compartments of the respective compartment systems.

In addition, according to an exemplary embodiment of all aspects of the invention, the first device may not be configured to transfer the hash value to the compartment system and/or can be configured not to transfer the hash value to the compartment system. For example, the first device may not be authorized to do so and/or may not have a communication connection to the compartment system or any compartment system at all. Thus, for example, a separation can be achieved between, on the one hand, the first device which, for example, determines only a few hash values, each based at least on a first piece of information and on a second piece of information, and on the other hand, a second device which receives many hash values and associated first pieces of information from many first devices, for example, and outputs these values to respective compartment systems. This separation can require an attacker to attack a plurality of first devices instead of one central (second) device in order to intercept a plurality of second information items that authorize access to respective compartments of respective compartment systems. This increases the effort for the attacker and thus the security of the system.

As an example of this an additional method is also disclosed, which is executed by a compartment system, for example, and comprises: obtaining or acquiring information; establishing, on the basis of the information, whether a first or second method is to be used to establish whether a second piece of information authorizes access to one or more compartments of the compartment system; if it was established that the first method is to be used to establish whether the second information authorizes access to one or more compartments of the compartment system, executing a first method, and if it was established that the second method is to be used to establish whether the second information authorizes access to one or more compartments of the compartment system, executing a second method to establish whether the second information authorizes access to one or more compartments of the compartment system. The additional method can be carried out, for example, in conjunction with the methods in accordance with the aspects one to four of the invention described above. In particular, the method referred to in this paragraph as the "first method" can be the method according to the fourth aspect of the invention. However, the additional method described in this paragraph is hereby also explicitly disclosed independently of the methods according to the first to fourth aspects of the invention.

The information on the basis of which it is established whether a first or second method is to be used to establish whether a second information item authorizes access to one or more compartments of the compartment system can be essentially of any type. For example, it can consist of a letter, a number, a pattern, a (wireless) signal, or a bit string. The information can be obtained or acquired together with or separately from a second piece of information. For example, the first information can be a letter preceded by a string of alphanumeric characters representing the second information.

In an exemplary embodiment of the additional method, the first and/or the second method for establishing whether the second information authorizes access to one or more compartments of the compartment system is knowledge-based and/or ownership-based and/or biometric-based. Thus, for example, the first method can be the method according to the fourth aspect of the invention. This method is knowledge-based, for example, and based on a "trio" of a first piece of information, a second piece of information, and a hash value, whereas knowledge of the second information item of this trio, for example, authorizes the user to one-time access to a compartment of the compartment system. For example, the first method thus is not user-dependent. Thus, for example, the first method is independent of whether a supplier is depositing a consignment or a recipient is picking one up. In particular, for example, no user ID is required.

For example, the second method can be based on biometrics and can therefore establish whether a second piece of information authorizes a user to access it, depending on the user. The second method may be, alternatively or additionally, ownership-based and may require a user, for example, to own a specific device, which is identified, for example, with a unique piece of information that can be acquired, obtained or established directly or indirectly from a compartment system, for example.

In one exemplary embodiment, the second method for establishing whether the second information authorizes access to one or more compartments of the compartment system can be carried out using data that can be attributed to a person or a device. This attributability can be achieved, for example, by storing the data accordingly, e.g. in a database. This can be, for example, a user ID of a recipient or supplier.

For example, by allowing a compartment system to establish, based on information obtained or acquired, whether a first type or a second type of information is to be used to establish whether a second piece of information authorizes access to one or more compartments of the compartment system, a compartment system can support, for example, various authentication or authorization options. This can increase the flexibility of the compartment system and corresponding methods for ensuring that only authorized users have access to compartments of the compartment system, for example by allowing a first method to be used independently of a user as such to establish whether a second piece of information authorizes access, and allowing a second method, based on information about a specific user or a specific user group, to be used to establish whether a second piece of information authorizes access.

For the additional method, a computer program and a device and a system are also disclosed, as were already disclosed for each of the four aspects of the invention described above. In particular, a computer program is thus disclosed for the additional method, comprising program instructions that cause a processor to execute and/or control the additional method when the computer program is running on the processor. In addition, in particular an apparatus or a system of two, three, four or more apparatuses is disclosed, which is configured for executing and/or controlling the additional method or comprising respective means for executing and/or controlling the steps of the additional method. In addition, in particular a device comprising at least one processor and at least one memory containing program code is disclosed, wherein the memory and the program code are configured to cause a device having the at least one processor to execute and/or control at least the additional method. For further details on exemplary embodiments of the computer program, the device and the system, explicit reference is made to the above description of the computer programs, devices and systems according to each of the four aspects of the invention. The descriptions there also apply to the additional method described here.

The exemplary embodiments described above and exemplary designs of all aspects of the present invention should also be understood as being disclosed in all combinations with one another.

Further advantageous exemplary designs of the invention can be found in the following detailed description of some exemplary embodiments of the present invention, in particular in conjunction with the figures. However, the figures attached to the application are intended only for the purpose of illustration and not for the purpose of defining the scope of protection of the invention. The attached drawings are not necessarily true to scale and are intended merely to reflect the general concept of the invention based on examples. In particular, features contained in the figures are not to be considered as a necessary component of the present invention. The sequence of the individual steps in the flowcharts does not necessarily specify the actual (temporal) sequence of the steps and is only exemplary. Nevertheless, the steps can occur/be carried out in the exact sequence shown in the flowcharts. In addition, they can, but do not need to, be carried out in response to one another.

BRIEF DESCRIPTION OF THE DRAWINGS

In the drawings:

FIG. 2 shows a flowchart of an exemplary embodiment of a method according to the first aspect of the present invention, for example executed and/or controlled by a device, e.g., a server;

FIG. 3 shows a flowchart of an exemplary embodiment of a method according to the second aspect of the present invention, for example executed and/or controlled by a device, e.g., a broker;

FIG. 4 shows a flowchart of an exemplary embodiment of a method according to the fourth aspect of the present invention, for example executed and/or controlled by a compartment system;

FIG. 6 shows a flowchart of an exemplary embodiment of a method according to the third aspect of the present invention, for example executed and/or controlled by a mobile device;

FIG. 7 shows a schematic representation of an exemplary embodiment of a device according to the first or second aspects of the invention, for example a server or broker;

DETAILED DESCRIPTION

Figure 1:
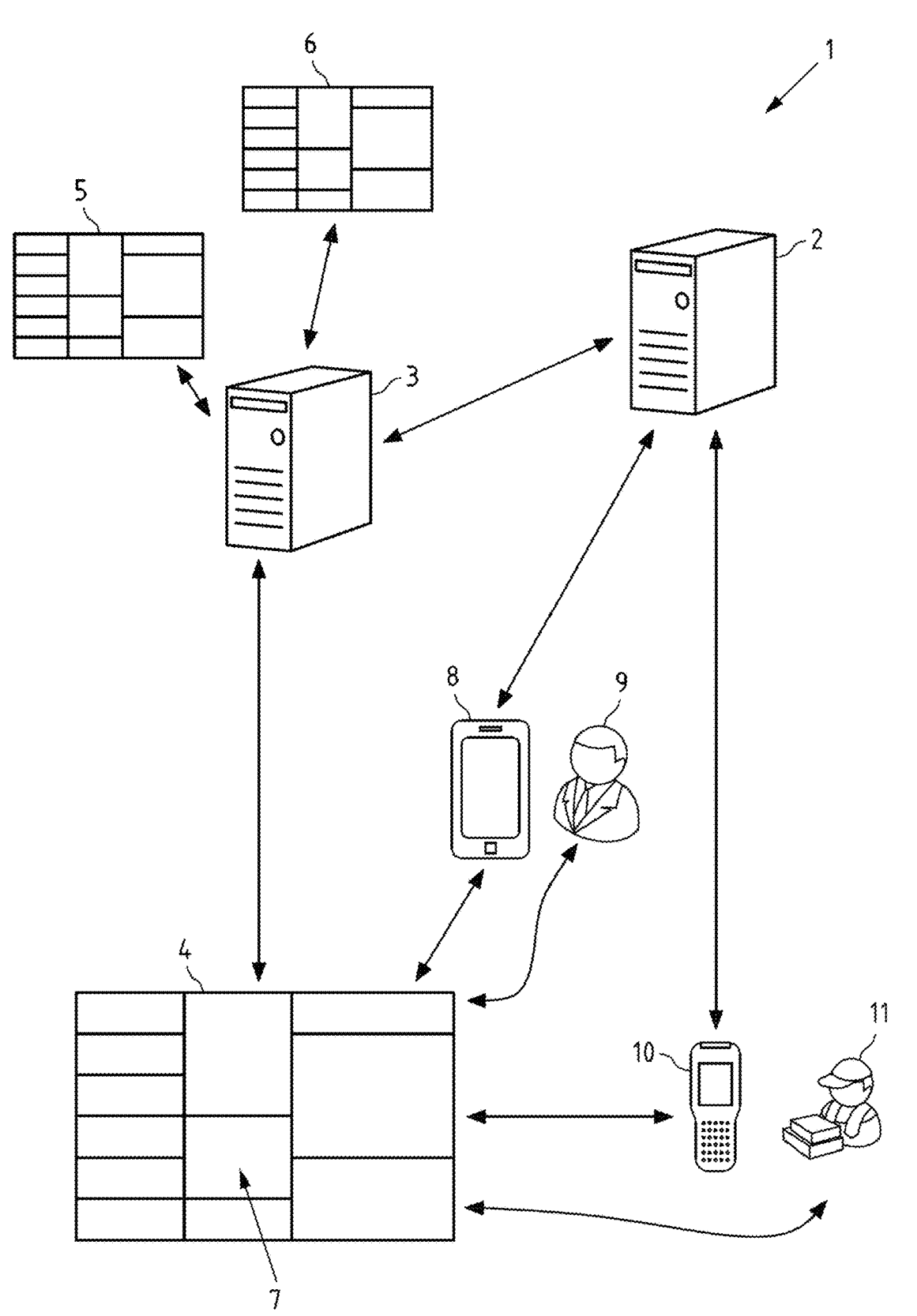
FIG. 1 shows a schematic representation of an exemplary embodiment of a system according to the present invention, comprising, for example, one or more compartment systems, one or more mobile devices, and two other devices, e.g., a server and a broker.

FIG. 1 shows a schematic illustration of an embodiment of a system according to the present invention.

The system 1 comprises a compartment system 4 with a multiplicity of compartments, one of which, as an example, is labeled in FIG. 1 with reference sign 7. Each of the compartments of the compartment system 4 is designed to receive one or more consignments. Each compartment is locked or closed in its initial state and can be electrically unlocked and opened individually and under the control of instructions, for example, by means of a lock control unit provided in the compartment system 4. An example of such a compartment system 4 is a compartment system 4 in accordance with the applicant's well-known package station concept.

There are various reasons for authorizing access to a compartment 7 of the compartment system 4. One example is the delivery or collection of a consignment by a user of the compartment system. For example, the user can be a supplier or a package courier 11. However, the user can also be another person, for example a recipient 9. As an example, an autonomous vehicle, a robot, a drone, or other devices can also be a user of the compartment system 4.

For example, in order for the user 9, 11 to gain access to a compartment 7 of the compartment system 4, it is necessary for the user to prove to the compartment system 4 their knowledge or possession of information which authorizes them to access the compartment 7 of the compartment system 4. A type of information that can authorize access to a compartment 7 of the compartment system 4 is also referred to below as "second information". The compartment system 4, in turn, must be able to establish whether a second obtained or acquired piece of information authorizes access to one or more compartments 7 of the compartment system 4. The information required for this purpose can be determined, for example, as described below and transferred to the compartment system 4.

First, a first device, which in this exemplary embodiment is a server 2, can determine a second piece of information. This second piece of information is intended to authorize access to a compartment 7 of the compartment system 4, for example if it is transferred to or provided for the compartment system 4 by a user 9, 11. The second information is therefore associated with this compartment 7 of the compartment system 4 and is stored, for example, on the server 2 in such a way that it remains possible to trace which compartment 7 of which compartment system 4 the second information is associated with.

The server 2 determines the second information randomly in order to increase the security of the system 1. In other embodiments, however, it can instead determine the second information, for example, according to a predetermined pattern or in response to a user input.

In this exemplary embodiment, the server 2 is controlled by way of example by a first organization, (e.g. a delivery service, an online retailer, etc.), e.g. a company. For example, the organization has deposited a consignment for one of its customers in a compartment 7 of the compartment system 4. Now it wants to enable the customer, e.g. the user 9, to collect the consignment from the compartment 7 of the compartment system 4. The server 2 outputs the second information, for example via an internet connection, to a device (previously also referred to as the "third device") of the user 9. In this exemplary embodiment, the example used for the "third device" is a smartphone 8. In other embodiments, the output from the server 2 can also be provided differently, for example by displaying the second information of the server 2 and of the smartphone 8 on a display or by another embodiment of the "third device" acquiring the second information.

After the user 9 or their smartphone 8 has obtained the second information from the server 2, they can transfer the second information to the compartment system 4 or make it available to the compartment system 4. There are several ways in which this transfer or provision can be made.

In some embodiments, the compartment system 4 is equipped with one or more communication interface(s), which comprises/comprise, for example, an interface for wireless communication with one or more of the mobile devices 8, 10. The wireless communication link is based, for example, on optical transmission and/or based on electrical, magnetic or electromagnetic signals or fields. The wireless communication connection can be in particular a short-range communication link based, for example, on Bluetooth, WLAN, ZigBee, NFC and/or RFID. In one exemplary embodiment, the smartphone 8 displays the second information as a QR code. The compartment system 4 can then acquire this QR code.

In other embodiments, however, the compartment system 4 does not comprise, for example, an interface for wireless communication with a mobile device 8, 10, or such an interface is, for example, not usable at all or not used in certain situations, even though it could be used in principle. For example, the transfer or provision of a second piece of information which is present on a mobile device 8, 10 and displayed there, for example, can be carried out by means of a user 9, 11. The user 9, 11 then enters the second information, for example via an input unit or user interface (e.g. a keyboard or a touch-sensitive screen with on-screen keyboard or a speech recognition module) on the compartment system 4 and thus transfers the second information. This means that the compartment system 4 can obtain the second information in this way. For example, a short transmission time can be achieved if the information is short. This can be particularly advantageous, for example, if the transmission must take place within a predetermined, e.g. short, time, for example in order to achieve a particularly high level of security, e.g. because a piece of authorization information only has a temporally limited validity.

After obtaining or acquiring the second information, the compartment system 4 can establish whether the second information authorizes access to one or more compartments 7 of the compartment system 4. However, since the second information was not created by the compartment system 4 and it is therefore generally not known to it, the system requires further information to verify a second piece of information.

For this reason, the compartment system 4 is configured, for example, for communication with the server 3, also referred to as a "broker". It thus has, for example, a communication interface that authorizes access to the internet or to another network to which the broker 3 is connected. For example, the compartment system 4 is configured for remote communication, so it has, for example, an interface to a cellular mobile communications system, a DSL interface, or a Local Area Network (LAN) interface, by means of which it can communicate with the broker 3.

The broker 3 is an exemplary embodiment of the above-mentioned "second device". For example, it is configured to manage and/or communicate with a plurality of compartment systems 4, 5, 6. For example, it is controlled by a second organization, such as a second company, such as the applicant. For example, the broker 3 is part of a different corporate technical network than the server 2. For example, the server 2 and the broker 3 can communicate with each other over the internet, for example, but cannot easily access each other's data. In other embodiments, however, the server 2 and the broker 3 can also be under the control of the same organization and still be separately secured so that they cannot easily access each other's data. For example, it can be beneficial for security if the server 2 and the broker 3 manage different datasets and/or have different functions.

Against the background that the server 2 and the broker 3 belong to different networks, it is also the case in this exemplary embodiment that the server 2 cannot communicate with the compartment system 4. The lack of a communication link can be due, for example, to the fact that the server 2 does not know how to reach the compartment system 4, i.e. does not know the IP address, for example. However, it can also be due, for example, to the fact that the server 2 cannot authenticate itself to the compartment system 4 as an authorized communication partner. The additional information required by the compartment system 4 to establish whether the second information authorizes access to one or more compartments 7 of the compartment system 4 (i.e. a first piece of information and a hash value) therefore originates from the server 2. However, the compartment system 4 receives it from the broker 3, for example, because the broker 3 can communicate with it, but the server 2 cannot.

Not only, but in particular in the exemplary situation when the server 2 and the broker 3 belong to different technical networks, it can increase the security of the system 1 if both devices 2, 3 do not process the second information in plain text. For example, the server 2 does not transmit the second information to the broker 3. Instead, the server 2 determines a hash value based on at least the second information and a first piece of information. The hash value in this example is an output value of a hashing algorithm and at least the first information and the second information are input values to the hashing algorithm. In particular, the first information in this exemplary embodiment is a salt for the hashing algorithm. The first information is determined by the server 2 as an example, e.g. randomly or based on a user input. In addition, the server 2 in the exemplary embodiment described here keeps the first information, i.e. the salt, constant over a predetermined period of time. For example, the server 2 uses the same salt for one week when using the hashing algorithm within the described method. If the server 2 determines a plurality of second information items during this period to allow users 9, 11 access to a compartment 7 of the compartment system 4, it thus determines a plurality of hash values based on different second pieces of information and based on the same first information. The first information is thus associated with the server 2, for example. However, in other embodiments, the first information can also be associated with the server 2 in such a way that the first information is associated with the first organization that controls the server 2.

The server 2 outputs the specified hash value and the first information to the broker 3. In some embodiments, the server 2 can also output additional information to the broker 3 that can be attributed to the specific hash value and the first information. Such additional information can be, for example, information about the compartment 7 of the compartment system 4 with which the hash value is associated.

After the broker 3 has obtained the first information and the hash value, the broker 3 determines, as an example, the compartment system 4 to which it should output the first information and the hash value. It then outputs the first information and the hash value to this compartment system 4.

The compartment system 4 thus receives the hash value and the first information from the broker 3 and is thus able to establish, based at least on the first information and the hash value, whether the second information authorizes access to one or more compartments 7 of the functional system 4.

In order to establish whether the second information authorizes access to one or more compartments 7 of the compartment system 4, in the exemplary embodiment described here, the compartment system 4 determines a check hash value, wherein the check hash value is based at least on the first information that the compartment system 4 has obtained from the broker 3, and on the second information that the compartment system 4 obtained or acquired from the smartphone 8 or user 9. To do this, it uses the same hashing algorithm that the server 2 used when determining the hash value. The configuration of the hashing algorithm may also have been obtained by the compartment system 4, for example, from the broker 3, which in turn obtained it from the server 2.

After the compartment system 4 has determined the check hash value, it compares the value with one or more hash values of a plurality of hash values that are each associated with a compartment 7 of the compartment system 4. By comparing the check hash value with one or more hash values of the plurality of hash values, or by means of using the comparison of the check hash value with one or more hash values of the plurality of hash values, it then establishes to which compartment 7 of the compartment system 4 or to which compartments 7 of the compartment system 4 the second information authorizes access.

If, on the basis of at least the first information and the hash value, the compartment system 4 has established that the second information authorizes access to one or more compartments 7 of the compartment system 4, in the present exemplary embodiment it grants access to the compartment 7. In addition, in the present exemplary embodiment it stores the second information. The storage of the second information can be used as proof, in particular in relation to the server 2. This is because with the second information, the compartment system 4 can show that access to the compartment 7 was granted because the second information was received in plain text.

The previously described comparison of a check hash value with one or more hash values of a plurality of hash values, which are each associated with a compartment 7 of the compartment system 4, has the advantageous effect that the server 2 uses the same salt for a predetermined period of time and does not use a new salt for each hash value. This reduces the number of check hash values that must be determined by the compartment system 4 for the comparison. The computing time on the compartment system 4 for determining check hash values thus does not increase linearly with the number of compartments 7 for which the compartment system has obtained hash values 4 from the server 2. Instead, a single time-consuming check hash value determination is sufficient for a second piece of information to compare the check hash value with the hash values for all compartments 7 that were generated based on the same salt and the same remaining configuration.

In some embodiments, a second piece of information has only a predetermined "lifetime". This means that in such exemplary embodiments there is a predetermined period of time, outside which the second information does not authorize access to a compartment 7 of the compartment system 4. If this period is longer than the period in which the server 2 uses the same salt, the following situation may occur. In this case, two different first pieces of information can be stored in the compartment system 4, both of which are associated with the server 2. In such a case, it is true that the compartment system will regularly have to determine two check hash values for one second piece of information, one for each first piece of information. Nevertheless, for a larger number of hash values originating from the server 2, it is not necessary to determine a check hash value for each combination of first information and second information.

Exemplary Embodiment of a Method According to the First Aspect of the Invention FIG. 2 shows a flowchart 20 of an exemplary embodiment of a method according to the first aspect of the present invention, for example executed and/or controlled by a device, e.g. a server. For example, the server is the server 2 from the system 1.

However, the exemplary embodiment of the method according to the first aspect of the present invention, as shown in flowchart 20, can also be carried out, for example, by a hand-held scanner 10 of a supplier 11. This can occur in particular if a supplier 11 was unable to deliver a consignment to the address of a recipient 9 and now wishes to deposit the consignment in a compartment 7 of a compartment system 4.

In step 21, a hash value is determined, wherein the hash value is based at least on a first piece of information and on a second piece of information, the hash value and the second information being associated with a compartment 7 of a compartment system 4, the second information authorizing access to the compartment 7 of the compartment system 4 and the first information being associated with the first device. In this exemplary embodiment, step 21 is executed in response to a user input. The user input can be carried out, for example, by a user who wants to allow another person, e.g. the supplier 11 or the recipient 9, access to a compartment 7 of a compartment system 4.

In step 22, the first information is output to a second device, wherein the second device is not the compartment system. For example, the output can take place after step 21 or in response to step 21. If it is an embodiment in which the server 2 determines a plurality of hash values at least based on the first information in a predetermined period of time, the output according to step 22 can also be made, for example, only once in the predetermined time period. The output can also include information indicating how long the first information will be used by the server 2, so that no new first information is to be expected from the server 2 during this time period.

In step 23, the hash value is output to the second device. The output can take place together with the first information, for example, in a message format that contains one or more of the following fields: a command identifier, a version ID, a unique identifier of the organization that controls the server 2, a unique ID of a compartment system 4 and a compartment 7, the hash value with associated parameter setting and associated first information, a counter, an expiration date, e.g. in UTC format, and/or a signature for all previous information. The output of the hash value can also be provided separately from the output of the first information.

In step 24, the second information is output to a third device, so that the second information can be output to the compartment system 4 or provided to the compartment system 4 using the third device or by the third device, wherein the third device is not the compartment system 4. The first information is therefore output, for example, to the smartphone 8 of a recipient 9 or to a hand-held scanner 10 of a supplier 11. The smartphone 8 or the hand-held scanner 10 can then transmit, for example, the second information to the compartment system 4, e.g. via Bluetooth. In addition or alternatively, they can provide the second information to the compartment system 4, e.g. as a QR code on a respective display unit.

In particular, steps 22, 23 and 24 can readily be performed in a different order. If a plurality of hash values are determined according to step 21, step 22 is not required for each specific hash value, particularly if the first information has not changed.

Exemplary Embodiment of a Method According to the Second Aspect of the Invention FIG. 3 shows a flowchart 30 of an exemplary embodiment of a method according to the second aspect of the present invention, for example executed and/or controlled by a device, e.g. a broker 3 as in the system 1.

In step 31, a first piece of information is obtained from a first device, the first information being associated with the first device.

In step 32, a hash value is obtained, the hash value being based at least on the first information and second piece of information, the hash value and the second information being associated with a compartment 7 of a compartment system 4 and the second information authorizing access to the compartment 7 of the compartment system 4. For example, an additional piece of information is obtained which makes it possible to establish the compartment system 4 with which the hash value is associated. In particular, the message format with which the first information and/or the hash value is obtained can be, for example, as described in step 23 of the flowchart 20.

In step 33 the hash value and the first information are output to the compartment system 4 so that the compartment system 4 can establish, based at least on the first information and the hash value, whether a second piece of information authorizes access to one or more compartments 7 of the compartment system 4. This output can also be carried out using the message format described for step 23. However, the message format in steps 22, 23, and/or 31, 32 does not need to be the same as the message format in this step. However, it can contain some or all of the same fields.

If a plurality of hash values is obtained as described in step 32, step 31 is not required for each hash value, in particular if hash values of the plurality of hash values are based on the same first information.

Exemplary Embodiment of a Method According to the Fourth Aspect of the Invention FIG. 4 shows a flowchart 40 of an exemplary embodiment of a method according to the fourth aspect of the present invention, for example executed and/or controlled by a compartment system 4.

In step 41, a hash value and a first piece of information are obtained from a second device, the hash value being associated with a compartment 7 of the compartment system 4 and the first information being associated with a first device. The receipt corresponds to the output of the hash value and the first information in step 33 of the flowchart 30. The message format in exemplary embodiments can therefore be the same as the message format described in relation to step 33.

In step 42, a second piece of information is obtained or acquired. In some embodiments, the second information can be obtained, for example, from the third device, for example via a short-range radio link such as Bluetooth. In other embodiments, the second information can be acquired, for example, by scanning an optical pattern such as a barcode or a QR code. In other embodiments, the second information can also be acquired by a user input, for example on a touch-sensitive display screen or a keyboard on the compartment system 4. For example, the second information can be obtained or acquired at any time, in particular e.g. at any time (e.g. 1 second, 1 minute, 1 hour, 1 day, 1 week, 1 month, 1 year) after step 41 has been executed.

In step 43, based at least on the first information and the hash value, it is established whether the second information authorizes access to one or more compartments 7 of the compartment system 4. In exemplary embodiments this step is executed in response to step 42. In other exemplary embodiments, however, the step can also have a different trigger, for example, a user input, for example on the compartment system 4.

Figure 5:
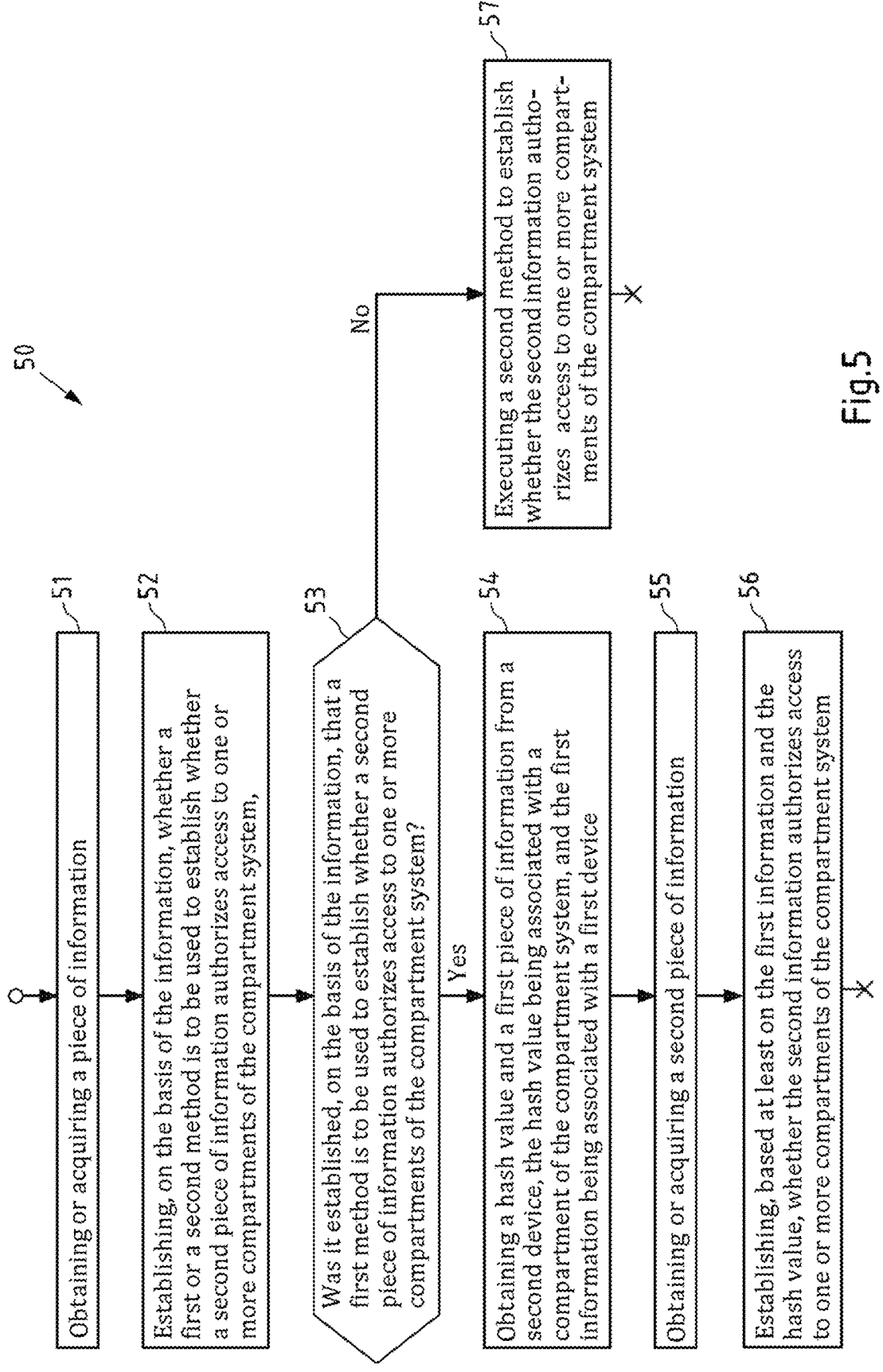
FIG. 5 shows a flowchart of an exemplary embodiment of a further method, which contains, as an example, the method according to the fourth aspect of the present invention, for example executed and/or controlled by a compartment system.

FIG. 5 shows a flowchart 50 of an exemplary embodiment of a method that includes the method according to the fourth aspect of the present invention, for example executed and/or controlled by a compartment system 4.

In step 51, a piece of information is obtained or acquired. In this exemplary embodiment, it is a single letter. This letter is obtained and acquired, for example, together with additional information, in particular with a second piece of information, for example. In other embodiments, the information can also be obtained or acquired separately. In addition, in other embodiments the information may have a different form, for example as one or more alphanumeric characters, as a single bit (flag), as a bit string, as an optical pattern, or as an acoustic signal.

In step 52, it is established on the basis of the information whether a first or second method is to be used to establish whether a second piece of information authorizes access to one or more compartments 7 of the compartment system 4. If the information is the letter "A", for example, it is established that a first method will be used to establish whether a second piece of information authorizes access to one or more compartments 7 of the compartment system 4. If the information is the letter "B", for example, it is established that a second method will be used to establish whether a second piece of information authorizes access to one or more compartments 7 of the compartment system 4. In some embodiments, for example, the letter may assume other values and there may be other ways to establish whether a second piece of information authorizes access to one or more compartments 7 of a compartment system 4.

For example, if it was established in step 53 that the first method will be used to establish whether the second information authorizes access to one or more compartments 7 of the compartment system 4, the method described in flowchart 40 can be executed in steps 54 through 56. However, the method described in the flowchart 50 is also explicitly disclosed independently of the method described in the flowchart 40. In particular, the steps 54 to 56 can then be replaced by another method for establishing whether the second information authorizes access to one or more compartments 7 of the compartment system 4. This other method may have a different form, e.g. as described in the example below for the second method for establishing whether the second information authorizes access to one or more compartments 7 of the compartment system 4.

If it was established in step 53 that the second method will be used to establish whether the second information authorizes access to one or more compartments 7 of the compartment system 4, then according to step 57 a second method can also be used to establish whether the second information authorizes access to one or more compartments 7 of the compartment system 4. The second method for establishing whether the second information authorizes access to one or more compartments 7 of the compartment system 4 is knowledge-based, for example. For example, a user must be able to answer a security question and/or know a password. The answer or the password will then be the second piece of information. In addition or alternatively, the second method for establishing whether the second information authorizes access to one or more compartments 7 of the compartment system 4 can be ownership-based in some embodiments. For example, the second piece of information is then proof of possession of e.g. a key or identification. Finally, the second method for establishing whether the second information authorizes access to one or more compartments 7 of the compartment system 4 can additionally or alternatively be biometrics-based in some embodiments. The second piece of information is then, for example, information about the facial features of a user 9, 11, or information about a fingerprint.

In some exemplary embodiments, the second method for establishing whether the second information authorizes access to one or more compartments 7 of the compartment system 4 is carried out using data that can be attributed to a person 9, 11 or a device 8, 10. In one embodiment, the second method is, for example, the authentication concept described at the beginning with a user ID and an opening code.

Overall, an advantage of the method according to the flowchart 50 is that different types of authentication are possible on the same compartment system 4. For example, the broker 3 can generate access data for a person 9, 11 registered with the broker 3 or for a device 8, 10 registered with the broker 3, which authorizes access to the compartment system. On the other hand, an "external" server 2 can also generate information (first information, second information, hash value) that authorizes access to the compartment system. Nevertheless, both systems can function separately and/or independently of each other. This increases the security and flexibility of the entire system. In addition, in such a case if either the server 2 or the broker 3 is compromised by an attacker, not all compartments 7 of a compartment system 4 are affected.

Exemplary Embodiment of a Method According to the Third Aspect of the Invention FIG. 6 shows a flowchart 60 of an exemplary embodiment of a method according to the third aspect of the present invention, for example executed and/or controlled by a mobile device. For example, the mobile device can be a smartphone 8 or a hand-held scanner 10 of a supplier 11.

Step 61 comprises obtaining or acquiring a second piece of information from a first device, the second information being associated with a compartment 7 of a compartment system 4, the second information authorizing access to the compartment 7 of the compartment system 4, and wherein the first device is not the compartment system 4. In exemplary embodiments, step 61 corresponds to step 24 of the flowchart 20. The second information can be obtained, for example, together with further information, e.g. with information indicating on which compartment system 4 the second information authorizes access to a compartment 7 of the compartment system 4. A further piece of information can also be, for example, for how long the second information is valid, i.e. for how long it authorizes access to a compartment 7 of the compartment system 4. After obtaining or capturing the second information, the second information can be stored, for example, in an app on a smartphone 8.

In step 62, the second information is transferred to the compartment system 4 or provided for the compartment system 4 so that the compartment system 4 can establish, based at least on a first piece of information and a hash value, whether the second information authorizes access to one or more compartments 7 of the compartment system 4, the first information being associated with the first device. Step 62 corresponds in some embodiments to step 42 of the flowchart 40 and in one exemplary embodiment also to step 51 of the flowchart 50. The options described there for acquiring or obtaining the second information apply analogously to the transfer or provision of the second information in accordance with step 62.

Exemplary Embodiment of a Device According to the First or Second Aspects of the Invention FIG. 7 shows a schematic representation of an exemplary embodiment of a device according to the first or second aspects of the invention, for example a server 2 or broker 3.

The device 70 comprises a processor 71, program memory 72, a RAM 73, an optional user data memory 74, and one or more communication interface(s) 75. For example, the processor executes a program according to the first or second aspect of the invention, which is stored in the program memory 72, for example as firmware. The RAM 73 is used in particular to store temporary data during program execution.

The user data memory 74 is used to store data that is required when the program is executed. For example, this could be a first and/or second piece of information and/or hash values.

In the case of one exemplary embodiment in which the device 70 is a device which executes the method according to the first aspect of the invention, the device 70 stores in the user data memory 74 one or more "trios" consisting (in each case) of a first piece of information, a second piece of information, and a hash value which is based at least on the (respective) first and the respective second information. Such a trio is stored, for example, in such a way that the three components of a trio can be attributed to one another. A piece of information attributed to such a trio, for example, can also be stored which indicates the compartment 7 with which the hash value and/or the first information and/or the second information are associated. Further information can also be stored in the user data memory 74. For example, the device 70 stores data for managing compartments 7 of one or more compartment systems 4, 5, 6, their respective contents, on users such as depositors 11, collectors 9 and inspectors, and/or for communication with the users 9, 11.

In particular, in the exemplary embodiment described here, the communication interface(s) 75 can comprise at least one interface for communication with other units of the system 1, in particular with the broker 3, the smartphone 8, indirectly with the user 9, the hand-held scanner 10, and indirectly with the supplier 11. This communication can be based on the Internet Protocol (IP), for example. For example, at least one of the communication interface(s) 75 is configured as a local area network (LAN) interface for this purpose. However, the communication link can also be completely or partially wireless-based.

In one exemplary embodiment, in which the device 70 is a device that executes the method according to the second aspect of the invention, the device 70 stores in the user data memory 74 hash values and respective first information items on which the respective hash values are based. The user data memory 74 also contains, for example, information about a plurality of compartment systems 4, 5, 6 and, for example, information about when and/or how the device 70 can communicate with the compartment systems 4, 5, 6. This applies, for example, to the output of a hash value and a first piece of information. However, the information and hash values obtained and to be output can also only be buffered in the RAM 73, for example. An exemplary device 70, which only forwards data, does not necessarily require a user data memory 74.

In this exemplary embodiment, the communication interface(s) 75 can also comprise at least one interface for communication with other units of the system 1, in particular with the server 2 and the compartment systems 4, 5, 6. For example, this communication can be based on the Internet Protocol (IP). For example, at least one of the communication interface(s) 75 is configured as a local area network (LAN) interface for this purpose. However, the communication link can also be completely or partially wireless-based in this exemplary embodiment.

Figure 8:
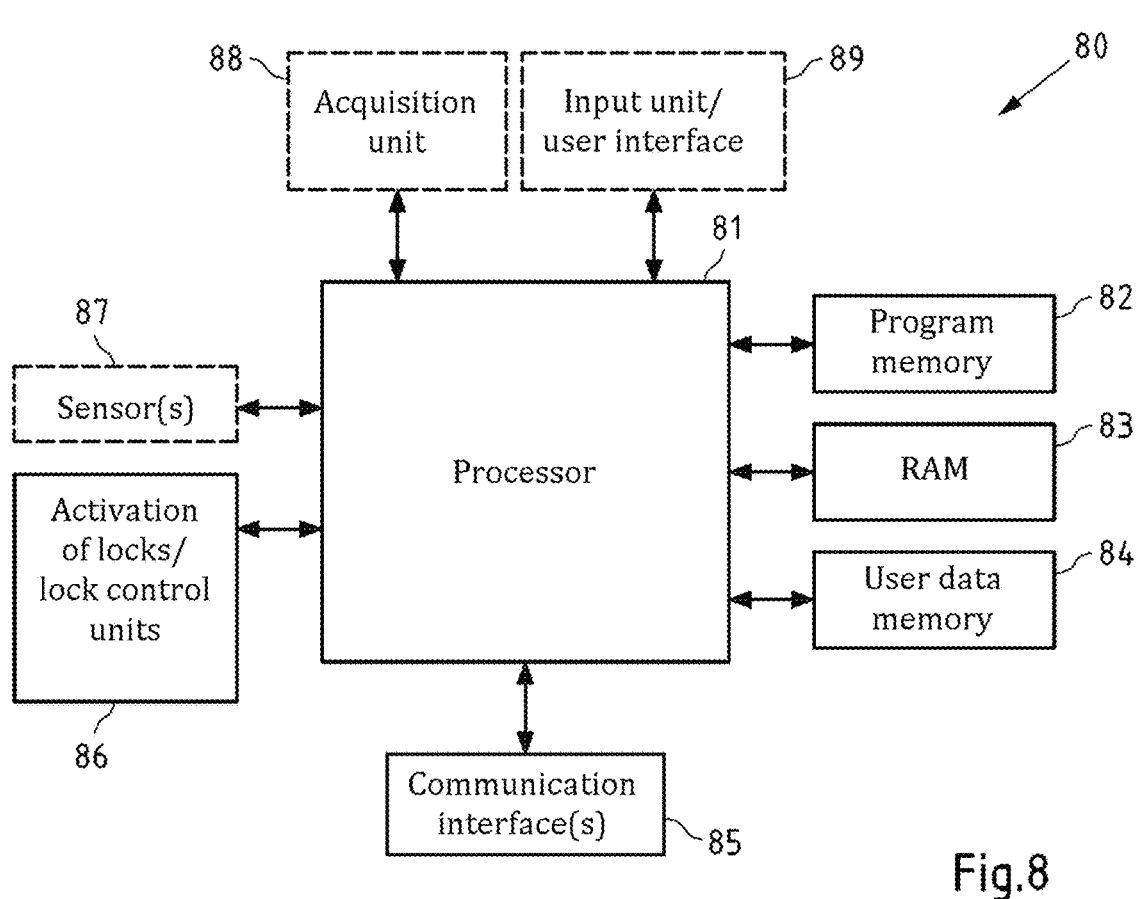
FIG. 8 shows a schematic representation of an exemplary embodiment of a device according to the fourth aspect of the invention, for example a compartment system.

Exemplary Embodiment of a Device According to the Fourth Aspect of the Invention FIG. 8 shows a schematic representation of an exemplary embodiment of a device according to the fourth aspect of the invention, for example a compartment system 4 or its control unit.

The device 80 comprises a processor 81, a program memory 82, a RAM 83, a user data memory 84, one or more communication interface(s) 85, an activation unit 86 for the locks or lock control units of the compartments 7 of the compartment system 4, one or more optional sensors 87, an optional acquisition unit 88, and an optional input/user interface 89. For example, the processor 81 executes a program according to the fourth aspect of the invention, which is stored in the program memory 82, for example as firmware. The RAM 83 is used in particular to store temporary data during program execution.

The user data memory 84 is used to store data that is required when the program is executed. For example, this may be first pieces of information obtained and hash values based on these first pieces of information. Additional data such as second pieces of information can also be stored in the user data memory 84, e.g. in data structures that also represent an attribution of hash values and/or first pieces of information and/or second pieces of information to respective compartments 7.

The communication interface(s) 85 comprises/comprise, for example, an interface for wireless communication with the devices 8 and/or 10, for example by means of optical transmission and/or communication based on electrical, magnetic or electromagnetic signals or fields, in particular Bluetooth, NFC and/or Radio Frequency Identification (RFID). The device 80, for example, is also configured for direct communication with the device 3, i.e. it has, for example, a communication interface which authorizes access to the internet or to another network to which the device 3 is connected.

The activation unit 86 allows a single compartment 7 of the compartment system 4 to be opened or unlocked selectively to enable its opening, in particular by activating the lock of the compartment 7 or a lock control unit of the compartment 7. In addition or alternatively, it can lock a compartment 7. The activation unit 86 is connected, for example, via respective wiring to all locks or lock control units of the compartment system 4 or is connected to a bus to which all locks or lock control units of the compartment system 4 are also connected.

The sensors 87 are optional and, for example, compartment-specific. For example, a sensor allows detection of whether a consignment is present in a particular compartment 7 and/or whether a consignment is or has been deposited in the compartment 7 and/or removed from the compartment 7.

The acquisition unit 88 is optional and in one exemplary embodiment is a scanner which can optically acquire information, e.g. a barcode or QR code, e.g. from a screen of a mobile device 8, 10. The acquisition unit 88 can additionally or alternatively be capable of acquiring and processing acoustic signals, e.g. by means of speech recognition.

The input device/user interface 89 is optional and is configured to communicate with a courier/supplier 11 and/or a user 9. The device can comprise, for example, an output device for displaying e.g. via a screen or via compartment-specific light displays (e.g. for displaying a particular occupied/unoccupied status) or outputting information acoustically and/or a unit for obtaining information and/or data (e.g. a keyboard or a touch-sensitive screen with on-screen keyboard or a speech recognition module) from the persons.

Figure 9:
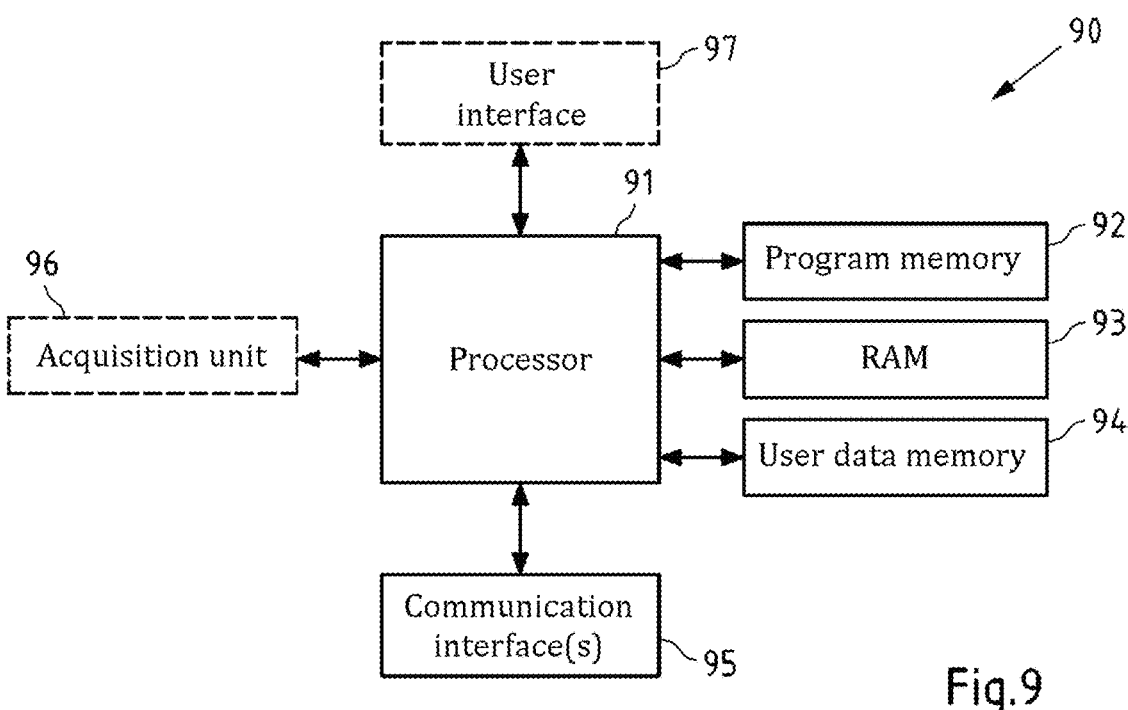
FIG. 9 shows a schematic representation of an exemplary embodiment of a device according to the third aspect of the invention, for example a mobile device.

Exemplary Embodiment of a Device According to the Third Aspect of the Invention FIG. 9 shows a schematic representation of an exemplary embodiment of a device according to the third aspect of the invention, for example a mobile device. The device 90 can be, for example, a portable scanning device of a courier/supplier (a so-called hand-held scanner 10), i.e. a device that is configured for optical acquisition of consignment or delivery data, in particular in the form of 2D or 3D barcodes, from the consignment or delivery. If the device 90 represents the device of the user 9, it can be in particular a smartphone 8, i.e. in particular a mobile phone with the ability to also run more complex programs, so-called apps, autonomously.

The device 90 comprises a processor 91, a program memory 92, a RAM 93, a user data memory 94, one or more communication interface(s) 95, an optional acquisition unit 96 for acquiring information, and an optional user interface 97.

For example, the processor 91 executes a program according to the third aspect of the invention, which is stored in the program memory 92, for example as an app or as firmware. The RAM 93 is used in particular to store temporary data during program execution.

The user data memory 94 is used to store data that is required when the program is executed, for example one or more second pieces of information.

The communication interface(s) 95 comprises/comprise one or more interfaces for communication between the device 90 and the device 2. For example, the interface can be based on IP, but because of the portability of the device 90 it can use a wireless transmission technology as the physical layer, based for example on cellular mobile communications (e.g. GSM, E-GSM, UMTS, LTE, 5G) or WLAN (Wireless Local Area Network). The communication interface(s) 95 also comprise an optional interface for communication with the compartment system 4, for example based on optical transmission, Bluetooth or NFC. In this case, a transmission technology with a relatively short range, for example less than 100 m or 10 m or 5 m, may be sufficient and possibly even desirable, to make it difficult for third parties to eavesdrop on the transmission.

The user interface 97 can be designed as a screen and keyboard or as a touch-sensitive display (touch screen), possibly with additional acoustic and/or haptic signaling units if necessary. The display of a second piece of information via the user interface 97 can render a separate interface 97 for communication with the compartment system 4 unnecessary if the second information can be entered into a user interface of the compartment system 4 (see user interface 89 of FIG. 8). For example, the acquisition unit 96 for acquiring a first piece of information and/or a hash value (e.g. in the form of an optical scanning unit) is only present as an option.

Figure 10:
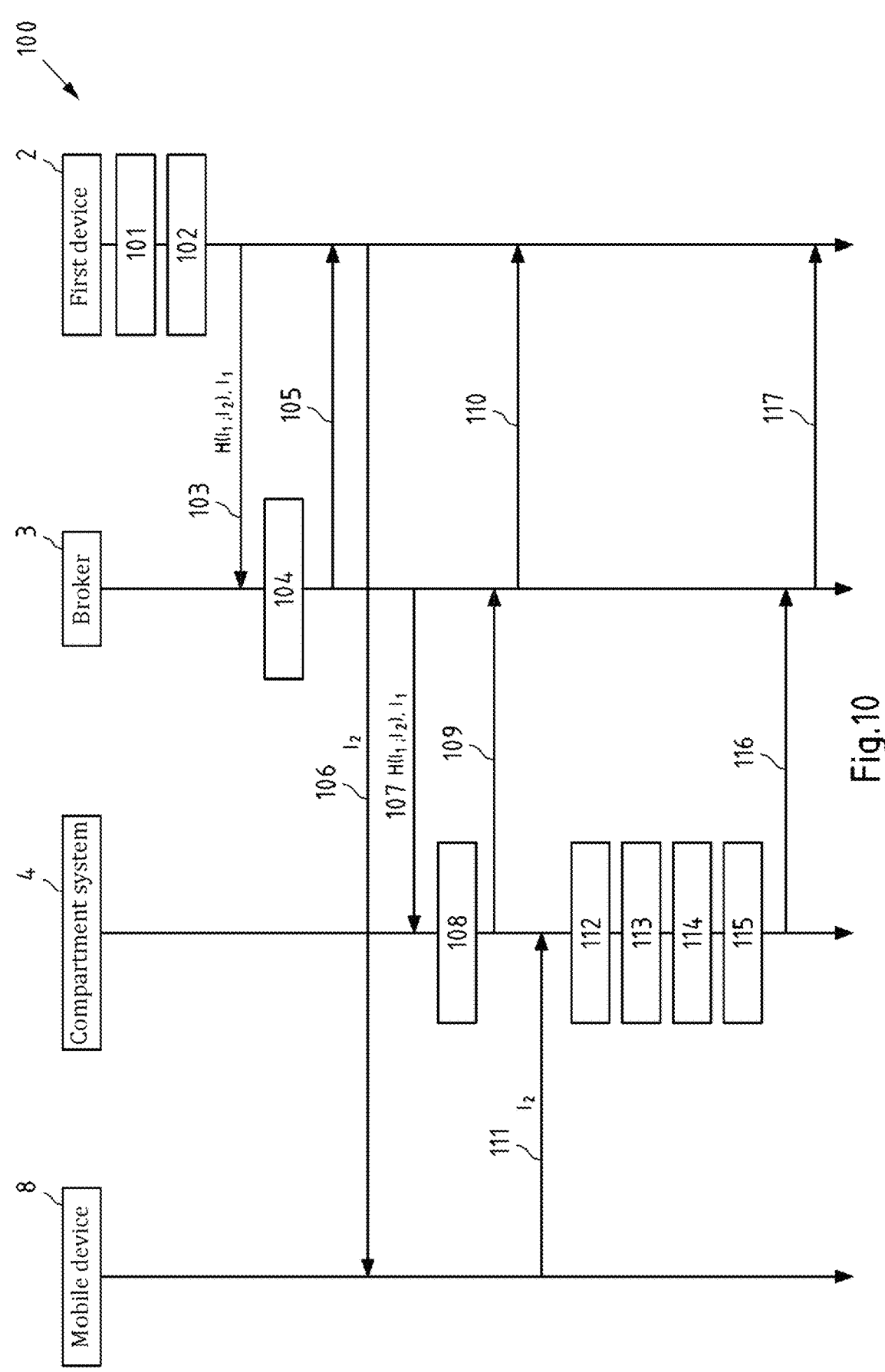
FIG. 10 shows a schematic representation of exemplary data transmissions between devices, in particular between an exemplary mobile device, an exemplary first device, an exemplary broker and an exemplary compartment system, each of which executes exemplary embodiments of methods in accordance with a respective aspect of the invention.

Exemplary Embodiment of a Plurality of Devices and Methods According to Various Aspects of the Invention FIG. 10 shows a schematic representation 100 of exemplary data transmissions between devices, in particular between an exemplary mobile device, an exemplary first device, an exemplary broker and an exemplary compartment system, each of which executes exemplary embodiments of methods in accordance with a respective aspect of the invention. The first device, which executes an embodiment of the method according to the first aspect of the invention, can be the server 2, for example. The broker 3 executes an example embodiment of the method according to the second aspect of the invention. The mobile device, which executes an embodiment of the method according to the third aspect, can be the smartphone 8 for example. The compartment system 4 executes an example embodiment of the method according to the fourth aspect of the invention.

Step 101 comprises the management of compartments of a compartment system 4 by means of a first device 2. This step includes, for example, that the first device 2 checks for which compartments of which compartment systems 4, 5, 6 it can generate second pieces of information that authorize access. In addition, the first device 2 checks, for example, which of these compartments are still empty. As an example, it establishes that it can determine a second piece of information that authorizes access to the compartment 7 of the compartment system 4. It therefore randomly determines a second piece of information that has the value "12345678".

In step 102, the first device 2 determines a hash value which is based at least on a first piece of information $I_1$ and on a second piece of information $I_2$, wherein the hash value and the second information $I_2$ are associated with the compartment 7 of the compartment system 4, wherein the second information $I_2$ authorizes access to the compartment 7 of the compartment system 4 and the first information $I_1$ is associated with the first device 2. The hash value is referred to in the following as $H(I_1;I_2)$. The first information $I_1$ in this exemplary embodiment is a salt for a hashing algorithm with the value "Qbnemd8cX6a8Qx1r". The hash value is determined by the first device 2 by means of a hashing algorithm of the Argon2 family and in this exemplary embodiment has the value "$argon2id$v=19$m=16, t=2, p=1$UWJuZW1kOGNYNmE4UXgxcg$KQRxIVr/Xt34Lq/KZq+6dA".

In step 103, the hash value $H(I_1;I_2)$ and the first information $I_1$ are output by the first device 2 to the broker 3. The transmission is confidential and binding, e.g. channel-encrypted, with an asymmetric signature.

In step 104, the broker 3 checks the correctness of the connection, the agreed transmission format and the integrity of the obtained information or the obtained hash value. In doing so, it checks the correctness of the connection by TLS checking against a pinned certificate, as one example. In addition, the broker 3 checks the integrity by plausibility checking the validity period of the obtained information or of the obtained hash value, an associated obtained counter value, and a signature. In addition, it checks the admissibility of the information obtained, e.g. whether the first device 2 is actually authorized to determine for the compartment 7 of the compartment system 4 a hash value and a second piece of information which authorizes access to the compartment 7. In addition, the broker 3 can also check the type of the message received.

If the check result is positive, the broker 3 sends a confirmation to the first device 2 in step 105, otherwise it sends an error message.

If the first device 2 receives a confirmation in step 105, it can assume that the compartment system 4 will establish that the second information $I_2$ authorizes access to the compartment 7 of the compartment system 4 if the compartment system 4 acquires or receives the second information from a mobile device 8. The first device 2 therefore sends the second information $I_2$ to the mobile device 8 in step 106. Step 106 can be carried out in response to the receipt of the confirmation in step 105. However, it can also be done in a time-independent manner, for example at a later point in time in response to a user input. In particular, step 106 can also be performed independently of one or more of the steps 106 to 110 in time, i.e. also after one or more of these steps.

If all the checks carried out in step 104 were positive, the broker 3 also outputs at least the hash value $H(I_1;I_2)$ and the first information $I_1$ to the compartment system 4 in step 107.

In step 108, the compartment system 4 checks the integrity and admissibility of the data obtained, at least comprising the hash value $H(I_1;I_2)$ and the first information $I_1$. The check can be performed partly or completely as described in step 104.

If the compartment system 4 has checked the data obtained, the first device 2 receives an asynchronous confirmation (in case of a positive result) or an error message (in case of a negative result) via the broker 3 in step 110 after the compartment system 4 has sent a message back to the broker in step 109.

In step 111, the compartment system 4 receives or acquires the second information $I_2$ from the mobile device 8. For example, this step can occur after steps 101 to 108, e.g. within 10 days after step 106.

For example, in response to the receipt of the second information $I_2$, in step 112 the compartment system 4 determines a check hash value that is based at least on the first information $I_1$ obtained in step 107 and the second information $I_2$ obtained or acquired in step 111. It then compares the check hash value with one or more hash values of a plurality of hash values that it has stored and each of which is associated with one compartment of the compartment system 4. In this way, it establishes that the check hash value matches the hash value $H(I_1;I_2)$ which is associated with the compartment 7 of the compartment system 4. This means that the compartment system 4 has established that the second information authorizes access to the compartment 7.

After this has been established, the compartment system 4 grants access to the compartment 7 in step 113, for example, by electrically unlocking or opening the compartment 7 using a lock control unit.

A user 9, 11 can then deposit a consignment in the compartment 7, collect a consignment from the compartment 7, or check what the contents of the compartment 7 are. Then, the user 9, 11 can close the compartment 7 again. The compartment system 4 detects the closure of the compartment 7 in step 114.

In step 115, the compartment system 4 logs the second information $I_2$ obtained in step 111 for which it has established authorizes access to the compartment 7.

The compartment system 4 then issues a confirmation to the broker 3 of the completed access in step 116. The broker 3 then sends this confirmation or part of the confirmation to the first device 2 in step 117. The first device 2 can then, for example, update its internal database for the occupation of compartments, which it checks regularly, for example, as part of step 101.

Exemplary Embodiment of a System

Figure 11:
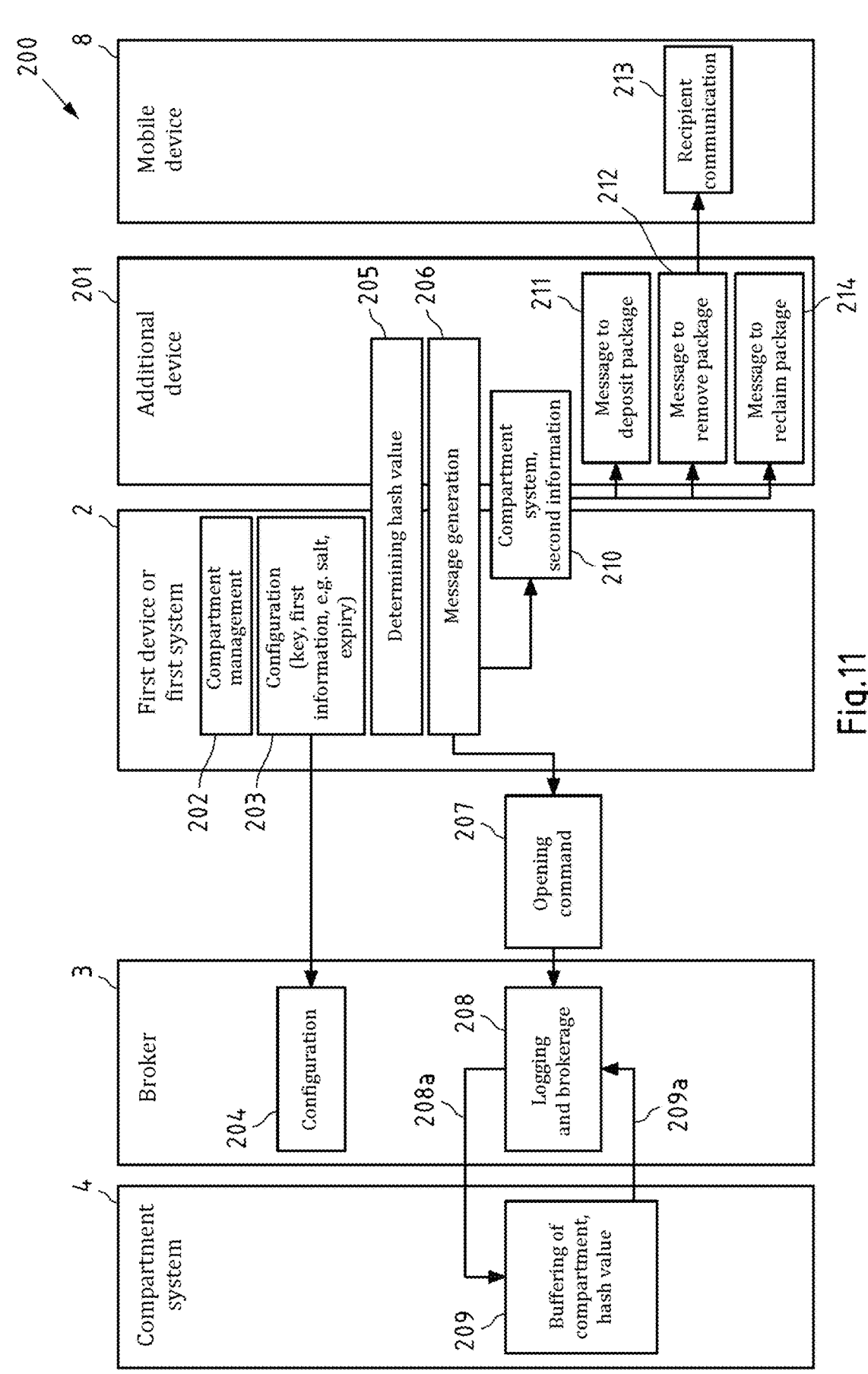
FIG. 11 shows a schematic representation of an exemplary embodiment of a system according to the present invention, comprising, for example, a compartment system, a mobile device, a broker, a first device or a first system, e.g., a server or a server system, and a further device.

FIG. 11 shows a schematic representation of an exemplary embodiment of a system 200 according to the present invention, comprising, for example, a compartment system 4, a mobile device 8, a broker 3, a first device 2 or a first system, e.g. a server or a server system, and a further device 201. In particular, FIG. 11 shows an example of the tasks that the various devices 2, 3, 4, 8, 201 have in the system 200.

For example, in some embodiments, the compartment system 4 essentially opens individual compartments and returns the status of the compartment (closed, open, defective). For example, the compartment system 4 does not know which user is working on the compartment system 4 and whether a compartment 7 is opened for filling or collection. In this context, the compartment system 4 only performs the receipt of hash values, associated first pieces of information and information about which compartment 7 of the compartment system 4 a hash value is associated with, and buffers this information, as shown in block 209.

The broker 3 manages, for example as the master, which first devices 2 can provide second information items for which compartments on which compartment systems that authorize access to a particular compartment of the respective compartment system. For this purpose, it receives, for example, opening commands 207 from a first device 2, each comprising information such as a hash value, a first piece of information, a version number, a compartment system identifier, a compartment identifier, an expiration date, a counter, a signature, and/or an ID of an organization that controls the first device 2. The broker 3 can then distribute 208a parts of the information obtained to the respective compartment systems and receives, for example, respective confirmations 209a (collectively also referred to as "brokerage") in return.

In the distribution 208a, first information items and hash values for multiple access operations can be linked. For example, a first piece of information and a hash value for a depositor and another hash value (and, if necessary, another first piece of information) for a collector can be transmitted together. As soon as the depositor has opened the compartment 7 and closed it again, for example, the first information and the hash value automatically become active for the collector. This type of shared transmission of information can enable the compartment system 4 to provide most functions even if a network connection is only sporadically available.

The broker 3 can log 208 all or some of the actions that the broker performs.

In addition the broker 3 manages, for example, a configuration 204 for the communication with the first device 2. The configuration 204 can comprise e.g. asymmetric keys and certificates for secure communication with the first device 2, specifications for the format of the second information and/or version and protocol settings. The configuration 204 in some embodiments can contain additional information, such as an expiration date of the configuration 204 or a first piece of information associated with the first device 2. The broker 3 receives the configuration 204 or parts of the configuration 204, for example, from the first device 2, where the corresponding configuration parts 203 are stored.

For example, unlike the broker 3 or the compartment system 4, the first device 2 or the first system 2 can also carry out a compartment administration 202. For example, the first device 2 keeps track of the occupation state of one or more compartments 7 of the compartment system 4. For these compartments 7, the first device 2 can determine hash values 205, for example, which are based at least on a (respective) first piece of information and a respective second piece of information. The first device 2 can then insert the hash values and the associated first information or the corresponding first information items in a message 206 and transmit them to the broker 3 in the form of "spiced hash values". For the respective second information items, the first device 2 can also generate messages 206. These messages 210 comprise, for example, the second information and a piece of information that indicates the compartment system 4 at which the second information authorizes access to a compartment 7. Depending on the purpose of the respective message 210, it is then output to different devices 201, 8, for example. If the second information in a message 211, 214 is to be used, for example, to deposit or reclaim a delivery in a compartment 7 of a compartment system 4, e.g. by a supplier 11, the output can be provided to the additional device 201, for example. The additional device 201 can be, for example, the hand-held scanner 10 of a supplier 11. The additional device 201 can also be, for example, the server of another organization which will organize the respective deposit or reclamation. For example, if the second information is to be used in a message 212 so that a delivery is removed from a compartment 7 of a compartment system 4, e.g. by a recipient 9, the communication 213 can take place directly with the mobile device 8 of the recipient or by forwarding via the additional device 201.

ADDITIONAL EXPLANATIONS

The exemplary embodiments and exemplary designs of the present invention described in this specification should also be understood as being disclosed in all combinations with one another. In particular, the description of a feature comprised by any embodiment, unless explicitly stated otherwise, is not intended to be understood in the present case in such a way that the feature is indispensable or essential to the function of the exemplary embodiment. The sequence of the method steps described in this specification in the individual flowcharts is not mandatory; alternative sequences of the method steps are conceivable. The method steps can be implemented in various ways, such as an implementation in software (by means of program instructions), hardware, or a combination of both, to implement the method steps. The terms used in the claims, such as "comprise", "have", "include", "contain" and the like, do not exclude further elements or steps. The wording "at least partially" includes both the "partial" and "complete" cases. The phrase "and/or" should be understood to mean that both the alternative and the combination are to be disclosed, i.e. "A and/or B" means "(A) or (B) or (A and B)". A plurality of units, persons or the like means multiple units, persons or the like in connection with this specification. The use of the indefinite article does not exclude the plural. A single device can perform the functions of more than one unit or device specified in the claims. Reference signs indicated in the claims are not to be regarded as limitations on the means and steps used.

The following exemplary embodiments shall also be considered to be disclosed:

Embodiment 1

Method, for example carried out by a first device, the method comprising:
determining a hash value, wherein the hash value is based at least on a first piece of information and on a second piece of information, the hash value and the second information being associated with a compartment of a compartment system, the second information authorizing access to the compartment of the compartment system, and the first information being associated with the first device,
outputting the first information to a second device, wherein the second device is not the compartment system,
outputting the hash value to the second device,
outputting the second information to a third device so that the second information can be output to the compartment system or made available to the compartment system using the third device or by the third device, wherein the third device is not the compartment system.

Embodiment 2

Method according to Embodiment 1, further comprising:
determining a plurality of hash values, each of which is based at least on the first information.

Embodiment 3

Method according to Embodiment 2, wherein the plurality of hash values, each of which is based at least on the first information, is only determined in a predetermined period of time, and wherein in another predetermined period of time hash values are determined, each of which is based at least on other information instead of at least on the first information.

Embodiment 4

Method according to any one of the previous embodiments, wherein the hash value is output in encrypted form and/or with an asymmetric signature and/or wherein the method further comprises:

outputting a counter that can be attributed to the hash value.

Embodiment 5

Method, for example carried out by a second device, the method comprising:
   obtaining a first piece of information from a first device, the first information being associated with the first device,
   obtaining a hash value, wherein the hash value is based at least on the first information and on a second piece of information, the hash value and the second information being associated with a compartment of a compartment system, and the second information authorizing access to the compartment of the compartment system,
   outputting the hash value and the first information to the compartment system so that the compartment system can establish, based at least on the first information and the hash value, whether a second piece of information authorizes access to one or more compartments of the compartment system.

Embodiment 6

Method according to Embodiment 5, wherein the hash value is one hash value of a plurality of hash values, each of which is based at least on the first information.

Embodiment 7

Method according to any one of Embodiments 5-6, wherein the hash value is obtained in encrypted form and/or with an asymmetric signature and/or wherein the method further comprises:
   obtaining a counter that can be attributed to the hash value.

Embodiment 8

Method, for example carried out by a compartment system, the method comprising:
   obtaining a hash value and a first piece of information from a second device, the hash value being associated with a compartment of the compartment system, and the first information being associated with a first device,
   obtaining or acquiring a second piece of information,
   establishing, based at least on the first information and the hash value, whether the second information authorizes access to one or more compartments of the compartment system.

Embodiment 9

Method according to Embodiment 8, further comprising:
   obtaining a plurality of hash values, each of which is associated with one compartment of the compartment system.

Embodiment 10

Method according to Embodiment 9, wherein the plurality of hash values comprises one or more hash values, each of which is based at least on the first information.

Embodiment 11

Method according to any one of Embodiments 8 to 10, wherein establishing whether the second information authorizes access to one or more compartments of the compartment system comprises:
   determining a check hash value, the check hash value being based at least on the first information and the second information.

Embodiment 12

Method according to Embodiment 11, wherein establishing whether the second information authorizes access to one or more compartments of the compartment system further comprises:
   comparing the check hash value with one or more hash values of a plurality of hash values, each of which is associated with one compartment in the compartment system.

Embodiment 13

Method according to Embodiment 12, wherein in establishing whether the second information authorizes to access to one or more compartments of the compartment system, by means of comparing the check hash value with one or more hash values of the plurality of hash values or by means of using the comparison of the check hash value with one or more hash values of the plurality of hash values, the compartment of the compartment system or the compartments of the compartment system to which the second information authorizes access is established.

Embodiment 14

Method according to any one of Embodiments 11-13, wherein the check hash value is an output value of a hashing algorithm, wherein at least the first information and the second information are input values to the hashing algorithm.

Embodiment 15

Method according to any one of Embodiments 8 to 14, further comprising:
   storing the second information if, based at least on the first information and the hash value, it was established that the second information authorizes access to one or more compartments of the compartment system.

Embodiment 16

Method according to any one of the previous embodiments, wherein the hash value is an output value of a hashing algorithm, wherein at least the first information and the second information are input values to the hashing algorithm.

Embodiment 17

Method according to any one of the previous embodiments, wherein the first information is additional information for a hashing algorithm, which is intended to increase the security of the hashing algorithm, for example a salt.

Embodiment 18

Method, for example carried out by a compartment system, the method comprising:

obtaining or acquiring a piece of information, establishing, on the basis of the information, whether a first or second method is to be used to establish whether a second piece of information authorizes access to one or more compartments of the compartment system, if it was established that the first method is to be used to establish whether the second information authorizes access to one or more compartments of the compartment system, executing a first method, the first method being the method according to any one of Embodiment 8 or Embodiments 9 to 17, insofar as it depends on embodiment 8, if it was established that the second method is to be used to establish whether the second information authorizes access to one or more compartments of the compartment system, executing a second method to establish whether the second information authorizes access to one or more compartments of the compartment system.

Embodiment 19

Method according to Embodiment 18, wherein the second method for establishing whether the second information authorizes access to one or more compartments of the compartment system is knowledge-based and/or ownership-based and/or biometric-based.

Embodiment 20

Method according to either of Embodiments 18-19, wherein the second method for establishing whether the second information authorizes access to one or more compartments of the compartment system is carried out using data that can be attributed to a person or a device.

Embodiment 21

Method, for example carried out by a mobile device, the method comprising:

obtaining or acquiring a second piece of information from a first device, the second information being associated with a compartment of a compartment system, the second information authorizing access to the compartment of the compartment system, and wherein the first device is not the compartment system, transferring the second information to the compartment system or providing the second information for the compartment system so that the compartment system can establish, based at least on a first piece of information and a hash value, whether the second information authorizes access to one or more compartments of the compartment system, the first information being associated with the first device.

Embodiment 22

Method according to any one of the previous embodiments, wherein the first device is not configured to transfer the hash value to the compartment system.

Embodiment 23

Method according to any one of the previous embodiments, wherein the second device is configured to transfer or provide the hash value to the compartment system and/or wherein the second device is configured to communicate with a plurality of compartment systems.

Embodiment 24

Method according to any one of the previous embodiments, wherein the second information is determined randomly, for example by the first device.

Embodiment 25

Method according to any one of the previous embodiments, wherein the second information authorizes access to the compartment of the compartment system with which it is associated only in a predetermined period of time.

Embodiment 26

Apparatus or system of three, four or more apparatuses, configured for executing and/or controlling the method according to any one of the previous embodiments or comprising respective means for executing and/or controlling the steps of the method according to any one of the previous embodiments.

Embodiment 27

Computer program, comprising program instructions that cause a processor to execute and/or control the method according to any one of Embodiments 1-25 when the computer program is running on the processor.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, for example carried out by a first device, the method comprising:

determining a hash value, wherein the hash value is based at least on first information and on second information, the hash value and the second information being associated with a compartment of a compartment system, the second information authorizing access to the compartment of the compartment system, and the first information being associated with the first device;

outputting the first information to a second device, wherein the second device is not the compartment system;

outputting the hash value to the second device; and outputting the second information to a third device so that the second information can be output to the compartment system or made available to the compartment system using the third device or by the third device, wherein the third device is not the compartment system.

2. A method, for example carried out by a second device, the method comprising:

obtaining first information from a first device, the first information being associated with the first device;

obtaining a hash value from the first device, wherein the hash value is based at least on the first information and on second information, the hash value and the second information being associated with a compartment of a compartment system, and the second information authorizing access to the compartment of the compartment system; and outputting the hash value and the first information to the compartment system so that the compartment system can establish, based at least on the first information and the hash value, whether second information provided to the compartment system authorizes access to one or more compartments of the compartment system.

3. A method, for example carried out by a compartment system, the method comprising:

obtaining a hash value and first information from a second device, the hash value being associated with a compartment of the compartment system, and the first information being associated with a first device;

obtaining or acquiring second information, wherein the second device does not have access to the second information; and establishing, based at least on the first information and the hash value, whether the second information authorizes access to one or more compartments of the compartment system.

4. A method, for example carried out by a third device, wherein the third device is a mobile device, the method comprising:

obtaining or acquiring second information from a first device, the second information being associated with a compartment of a compartment system, the second information authorizing access to the compartment of the compartment system, and wherein the first device is not the compartment system; and transferring the second information to the compartment system or providing the second information for the compartment system so that the compartment system can establish, based at least on first information and a hash value, whether the second information authorizes access to one or more compartments of the compartment system, the first information being associated with the first device;

wherein the hash value is based at least on the first information and on the second information and is determined by the first device;

wherein the first information and the hash value are obtained by the compartment system from a second device, which does not have access to the second information.

5. An apparatus that is a first device or a part thereof, comprising at least one processor and at least one memory including program code, the at least one memory and the program code configured to, with the at least one processor, cause the apparatus to perform and/or control at least:

determining a hash value, wherein the hash value is based at least on first information and on second information, the hash value and the second information being associated with a compartment of a compartment system, the second information authorizing access to the compartment of the compartment system, and the first information being associated with the first device;

outputting the first information to a second device, wherein the second device is not the ompartment system;

outputting the hash value to the second device; and outputting the second information to a third device so that the second information can be output to the compartment system or made available to the compartment system using the third device or by the third device, wherein the third device is not the compartment system.

6. The apparatus of claim 5, wherein the at least one memory and the program code are further configured to, with the at least one processor, cause the apparatus to perform and/or control at least:

determining a plurality of hash values, each of which is based at least on the first information.

7. The apparatus of claim 6, wherein the plurality of hash values, each of which is based at least on the first information, is only determined in a predetermined period of time, and wherein in another predetermined period of time, hash values are determined, each of which is based at least on other information instead of at least on the first information.

8. The apparatus of claim 5, wherein the hash value is output in encrypted form and/or with an asymmetric signature and/or wherein the at least one memory and the program code are further configured to, with the at least one processor, cause the apparatus to perform and/or control at least:

outputting a counter that can be attributed to the hash value.

9. The apparatus of claim 5, wherein the hash value is an output value of a hashing algorithm, wherein at least the first information and the second information are input values to the hashing algorithm.

10. The apparatus of claim 5, wherein the first information is additional information for a hashing algorithm, which is intended to increase a security of the hashing algorithm, for example a salt.

11. An apparatus comprising at least one processor and at least one memory including program code, the at least one memory and the program code configured to, with the at least one processor, cause the apparatus to perform and/or control at least:

obtaining first information from a first device, the first information being associated with the first device;

obtaining a hash value from the first device, wherein the hash value is based at least on the first information and on second information, the hash value and the second information being associated with a compartment of a compartment system, and the second information authorizing access to the compartment of the compartment system; and outputting the hash value and the first information to the compartment system so that the compartment system can establish, based at least on the first information and the hash value, whether second information provided to the compartment system authorizes access to one or more compartments of the compartment system.

12. The apparatus of claim 11, wherein the hash value is one hash value of a plurality of hash values, each of which is based at least on the first information.

13. The apparatus of claim 11, wherein the hash value is obtained in encrypted form and/or with an asymmetric signature and/or wherein the at least one memory and the program code are further configured to, with the at least one processor, cause the apparatus to perform and/or control at least:

obtaining a counter that can be attributed to the hash value.

14. An apparatus that is a compartment system or a part thereof, comprising at least one processor and at least one memory including program code, the at least one memory and the program code configured to, with the at least one processor, cause the apparatus to perform and/or control at least:

obtaining a hash value and first information from a second device, the hash value being associated with a compartment of the compartment system, and the first information being associated with a first device;

obtaining or acquiring second information, wherein the second device does not have access to the second information; and establishing, based at least on the first information and the hash value, whether the second information authorizes access to one or more compartments of the compartment system.

15. The apparatus of claim 14, wherein the at least one memory and the program code are further configured to, with the at least one processor, cause the apparatus to perform and/or control at least:

obtaining a plurality of hash values, each of which is associated with one compartment of the compartment system.

16. The apparatus of claim 15, wherein the plurality of hash values comprises one or more hash values, each of which is based at least on the first information.

17. The apparatus of claim 14, wherein establishing whether the second information authorizes access to one or more compartments of the compartment system comprises:

determining a check hash value, the check hash value being based at least on the first information and the second information.

18. The apparatus of claim 17, wherein establishing whether the second information authorizes access to one or more compartments of the compartment system further comprises:

comparing the check hash value with one or more hash values of a plurality of hash values, each of which is associated with one compartment in the compartment system.

19. The apparatus of claim 18, wherein in establishing whether the second information authorizes to access to one or more compartments of the compartment system, by means of comparing the check hash value with one or more hash values of the plurality of hash values or by means of using the comparison of the check hash value with one or more hash values of the plurality of hash values, the compartment of the compartment system or the compartments of the compartment system to which the second information authorizes access is established.

20. The apparatus of claim 17, wherein the check hash value is an output value of a hashing algorithm, and wherein at least the first information and the second information are input values to the hashing algorithm.

21. The apparatus of claim 14, wherein the at least one memory and the program code are further configured to, with the at least one processor, cause the apparatus to perform and/or control at least:

storing the second information if, based at least on the first information and the hash value, it was established that the second information authorizes access to one or more compartments of the compartment system.

22. An apparatus comprising at least one processor and at least one memory including program code, the at least one memory and the program code configured to, with the at least one processor, cause the apparatus to perform and/or control at least:

obtaining or acquiring second information from a first device, the second information being associated with a compartment of a compartment system, the second information authorizing access to the compartment of the compartment system, and wherein the first device is not the compartment system; and transferring the second information to the compartment system or providing the second information for the compartment system so that the compartment system can establish, based at least on first information and a hash value, whether the second information authorizes access to one or more compartments of the compartment system, the first information being associated with the first device;

wherein the hash value is based at least on the first information and on the second information and is determined by the first device;

wherein the first information and the hash value are obtained by the compartment system from a second device, which does not have access to the second information.

\* \* \* \* \*